US012634022B2

(12) United States Patent
Ibrahim et al.

(10) Patent No.: US 12,634,022 B2
(45) Date of Patent: May 19, 2026

(54) REFERENCE RESOURCE OR CAPABILITY FOR CROSS-LINK INTERFERENCE MEASUREMENT

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 18/466,495

(22) Filed: Sep. 13, 2023

(65) Prior Publication Data

US 2024/0121019 A1     Apr. 11, 2024

Related U.S. Application Data

(60) Provisional application No. 63/378,849, filed on Oct. 7, 2022.

(51) Int. Cl.
| | |
|---|---|
| *H04B 17/336* | (2015.01) |
| *H04L 27/26* | (2006.01) |
| *H04W 8/22* | (2009.01) |

(52) U.S. Cl.
CPC ..... *H04B 17/336* (2015.01); *H04L 27/26025* (2021.01); *H04W 8/22* (2013.01)

(58) Field of Classification Search
None
See application file for complete search history.

(56) References Cited

U.S. PATENT DOCUMENTS

| | | | | |
|---|---|---|---|---|
| 11,641,264 | B2 * | 5/2023 | Manolakos | H04L 5/0048 |
| | | | | 370/252 |
| 11,743,021 | B2 * | 8/2023 | Zhang | H04L 5/0048 |
| | | | | 370/329 |
| 12,108,267 | B2 * | 10/2024 | Park | H04L 5/00 |
| 12,279,145 | B2 * | 4/2025 | Jin | H04L 5/0035 |
| 12,369,063 | B2 * | 7/2025 | Zhang | H04L 5/0092 |
| 2017/0048749 | A1 * | 2/2017 | Kim | H04W 72/541 |
| 2018/0367346 | A1 * | 12/2018 | Chen | H04L 5/0051 |
| 2019/0173639 | A1 * | 6/2019 | Tang | H04L 5/0048 |
| 2020/0228212 | A1 * | 7/2020 | Xu | H04L 27/2602 |
| 2021/0006438 | A1 * | 1/2021 | Harrebek | H04W 24/10 |
| 2021/0021355 | A1 * | 1/2021 | Hwang | H04W 8/24 |
| 2021/0212033 | A1 * | 7/2021 | Islam | H04L 1/0026 |

(Continued)

*Primary Examiner* — Otis L Thompson, Jr.
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a cross-link interference (CLI) measurement reporting configuration indicating a reporting resource for reporting of a CLI measurement regarding an aggressor network node or an aggressor UE associated with the aggressor network node. The UE may transmit a CLI measurement report on the reporting resource, the CLI measurement report indicating the CLI measurement on a measurement resource that occurs no later than a CLI reference resource that is defined by an offset relative to the reporting resource. Numerous other aspects are described.

30 Claims, 15 Drawing Sheets

800 →

(56) References Cited

U.S. PATENT DOCUMENTS

| | | | | |
|---|---|---|---|---|
| 2021/0368371 A1* | 11/2021 | Wang | .................... | H04L 5/0073 |
| 2022/0060308 A1* | 2/2022 | Xu | ......................... | H04L 5/0094 |
| 2022/0069928 A1* | 3/2022 | Hwang | ................ | H04W 24/10 |
| 2022/0174528 A1* | 6/2022 | Sedin | .................... | H04W 24/08 |
| 2022/0191724 A1* | 6/2022 | Hwang | ................ | H04B 17/336 |
| 2023/0055304 A1* | 2/2023 | Shim | .................. | H04W 72/541 |
| 2023/0072049 A1* | 3/2023 | Ersbo | .................. | H04L 5/0078 |
| 2023/0147146 A1* | 5/2023 | Ren | .................. | H04W 56/0035 |
| | | | | 370/329 |
| 2023/0189020 A1* | 6/2023 | Calcev | ............. | H04W 74/0866 |
| | | | | 370/329 |
| 2023/0328771 A1* | 10/2023 | Zhang | ............... | H04B 7/06964 |
| | | | | 370/225 |
| 2024/0235643 A1* | 7/2024 | Zhang | ................. | H04B 7/0632 |
| 2025/0226898 A1* | 7/2025 | Xiong | .................. | H04L 27/261 |

* cited by examiner

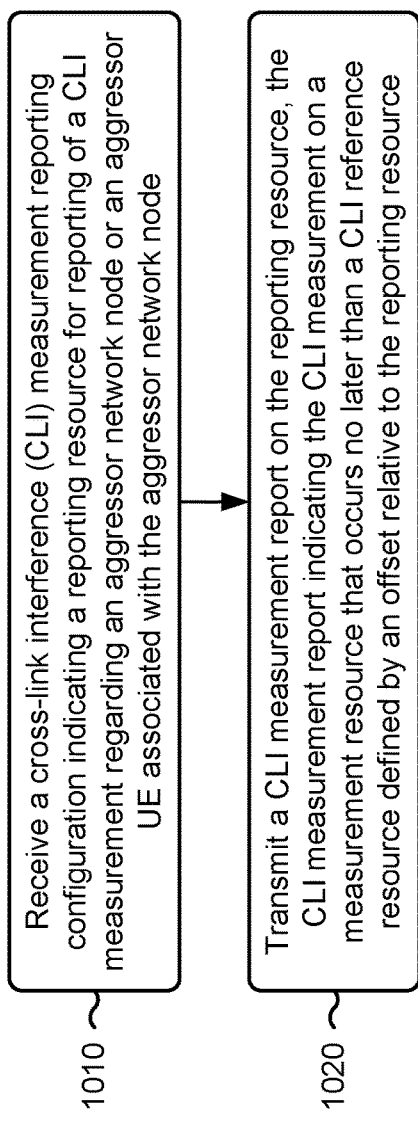

1010 Receive a cross-link interference (CLI) measurement reporting configuration indicating a reporting resource for reporting of a CLI measurement regarding an aggressor network node or an aggressor UE associated with the aggressor network node

1020 Transmit a CLI measurement report on the reporting resource, the CLI measurement report indicating the CLI measurement on a measurement resource that occurs no later than a CLI reference resource defined by an offset relative to the reporting resource

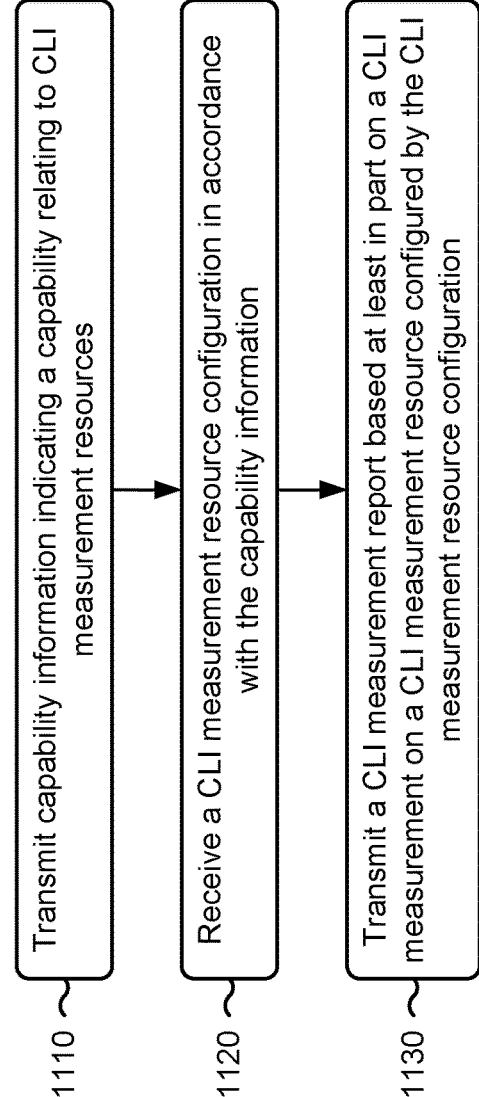

1110 Transmit capability information indicating a capability relating to CLI measurement resources 1120 Receive a CLI measurement resource configuration in accordance with the capability information 1130 Transmit a CLI measurement report based at least in part on a CLI measurement on a CLI measurement resource configured by the CLI measurement resource configuration

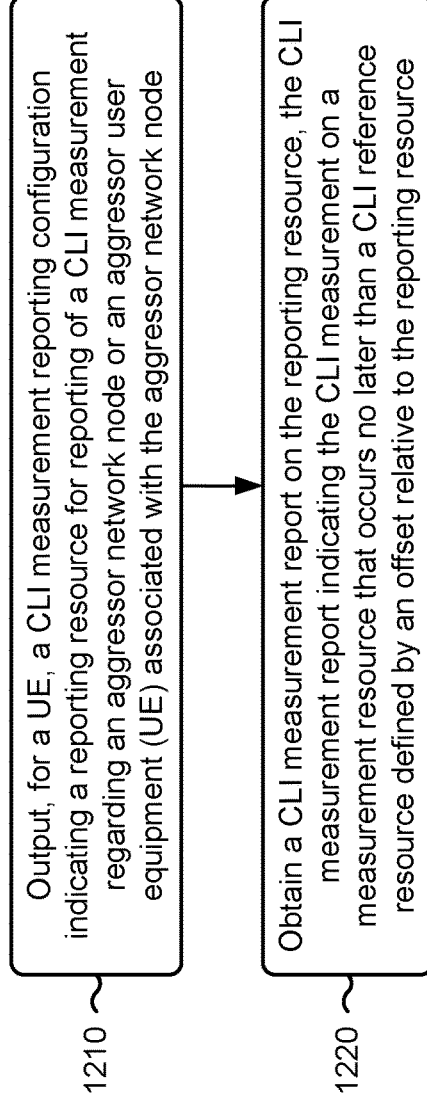

1210 — Output, for a UE, a CLI measurement reporting configuration indicating a reporting resource for reporting of a CLI measurement regarding an aggressor network node or an aggressor user equipment (UE) associated with the aggressor network node 1220 — Obtain a CLI measurement report on the reporting resource, the CLI measurement report indicating the CLI measurement on a measurement resource that occurs no later than a CLI reference resource defined by an offset relative to the reporting resource

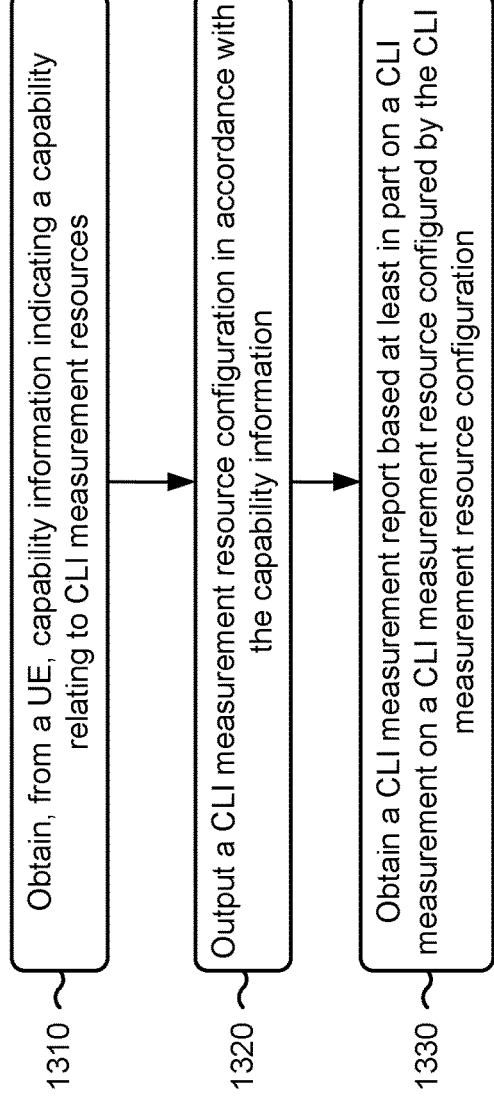

1310 — Obtain, from a UE, capability information indicating a capability relating to CLI measurement resources 1320 — Output a CLI measurement resource configuration in accordance with the capability information 1330 — Obtain a CLI measurement report based at least in part on a CLI measurement on a CLI measurement resource configured by the CLI measurement resource configuration

1300

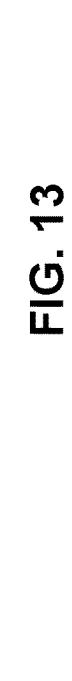

REFERENCE RESOURCE OR CAPABILITY FOR CROSS-LINK INTERFERENCE MEASUREMENT

REFERENCE RESOURCE OR CAPABILITY
FOR CROSS-LINK INTERFERENCE
MEASUREMENT

This patent application claims priority to U.S. Provisional Patent Application No. 63/378,849, filed on Oct. 7, 2022, entitled "REFERENCE RESOURCE OR CAPABILITY FOR CROSS-LINK INTERFERENCE MEASURE-MENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a reference resource or a capability for cross-link interference measurement.

BACKGROUND

Wireless communication systems are widely deployed to provide various telecommunication services such as telephony, video, data, messaging, and broadcasts.

Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a cross-link interference (CLI) measurement reporting configuration indicating a reporting resource for reporting of a CLI measurement regarding an aggressor network node or an aggressor UE associated with the aggressor network node. The method may include transmitting a CLI measurement report on the reporting resource, the CLI measurement report indicating the CLI measurement on a measurement resource that occurs no later than a CLI reference resource that is defined by an offset relative to the reporting resource.

Some aspects described herein relate to a method of wireless communication performed by a UE. The method may include transmitting capability information indicating a capability relating to CLI measurement resources. The method may include receiving a CLI measurement resource configuration in accordance with the capability information. The method may include transmitting a CLI measurement report based at least in part on a CLI measurement on a CLI measurement resource configured by the CLI measurement resource configuration.

Some aspects described herein relate to a method of wireless communication performed by a network node. The method may include outputting, for a UE, a CLI measurement reporting configuration indicating a reporting resource for reporting of a CLI measurement regarding an aggressor network node or an aggressor UE associated with the aggressor network node. The method may include obtaining a CLI measurement report on the reporting resource, the CLI measurement report indicating the CLI measurement on a measurement resource that occurs no later than a CLI reference resource that is defined by an offset relative to the reporting resource.

Some aspects described herein relate to a method of wireless communication performed by a network node. The method may include obtaining, from a UE, capability information indicating a capability relating to CLI measurement resources. The method may include outputting a CLI measurement resource configuration in accordance with the capability information. The method may include obtaining a CLI measurement report based at least in part on a CLI measurement on a CLI measurement resource configured by the CLI measurement resource configuration.

Some aspects described herein relate to a UE for wireless communication. The UE may include a memory, a transceiver, and one or more processors coupled to the memory and the transceiver. The one or more processors may be configured to receive, via the transceiver, a CLI measurement reporting configuration indicating a reporting resource for reporting of a CLI measurement regarding an aggressor network node or an aggressor UE associated with the aggressor network node. The one or more processors may be configured to transmit, via the transceiver, a CLI measurement report on the reporting resource, the CLI measurement report indicating the CLI measurement on a measurement resource that occurs no later than a CLI reference resource that is defined by an offset relative to the reporting resource.

Some aspects described herein relate to a UE for wireless communication. The UE may include a memory, a transceiver, and one or more processors coupled to the memory and the transceiver. The one or more processors may be configured to transmit capability information indicating a capability relating to CLI measurement resources. The one or more processors may be configured to receive, via the transceiver, a CLI measurement resource configuration in accordance with the capability information. The one or more processors may be configured to transmit, via the transceiver, a CLI measurement report based at least in part on a CLI measurement on a CLI measurement resource configured by the CLI measurement resource configuration.

Some aspects described herein relate to a network node for wireless communication. The network node may include a memory and one or more processors coupled to the memory. The one or more processors may be configured to output, for a UE, a CLI measurement reporting configuration indicating a reporting resource for reporting of a CLI measurement regarding an aggressor network node or an aggressor UE associated with the aggressor network node. The one or more processors may be configured to obtain a CLI measurement report on the reporting resource, the CLI measurement report indicating the CLI measurement on a measurement resource that occurs no later than a CLI reference resource that is defined by an offset relative to the reporting resource.

Some aspects described herein relate to a network node for wireless communication. The network node may include a memory and one or more processors coupled to the memory. The one or more processors may be configured to obtain, from a UE, capability information indicating a capability relating to CLI measurement resources. The one or more processors may be configured to output a CLI measurement resource configuration in accordance with the capability information. The one or more processors may be configured to obtain a CLI measurement report based at least in part on a CLI measurement on a CLI measurement resource configured by the CLI measurement resource configuration.

Some aspects described herein relate to a non-transitory computer-readable medium that stores a set of instructions for wireless communication by a UE. The set of instructions, when executed by one or more processors of the UE, may cause the UE to receive a CLI measurement reporting configuration indicating a reporting resource for reporting of a CLI measurement regarding an aggressor network node or an aggressor UE associated with the aggressor network node. The set of instructions, when executed by one or more processors of the UE, may cause the UE to transmit a CLI measurement report on the reporting resource, the CLI measurement report indicating the CLI measurement on a measurement resource that occurs no later than a CLI reference resource that is defined by an offset relative to the reporting resource.

Some aspects described herein relate to a non-transitory computer-readable medium that stores a set of instructions for wireless communication by a UE. The set of instructions, when executed by one or more processors of the UE, may cause the UE to transmit capability information indicating a capability relating to CLI measurement resources. The set of instructions, when executed by one or more processors of the UE, may cause the UE to receive a CLI measurement resource configuration in accordance with the capability information. The set of instructions, when executed by one or more processors of the UE, may cause the UE to transmit a CLI measurement report based at least in part on a CLI measurement on a CLI measurement resource configured by the CLI measurement resource configuration.

Some aspects described herein relate to a non-transitory computer-readable medium that stores a set of instructions for wireless communication by a network node. The set of instructions, when executed by one or more processors of the network node, may cause the network node to output, for a UE, a CLI measurement reporting configuration indicating a reporting resource for reporting of a CLI measurement regarding an aggressor network node or an aggressor UE associated with the aggressor network node. The set of instructions, when executed by one or more processors of the network node, may cause the network node to obtain a CLI measurement report on the reporting resource, the CLI measurement report indicating the CLI measurement on a measurement resource that occurs no later than a CLI reference resource that is defined by an offset relative to the reporting resource.

Some aspects described herein relate to a non-transitory computer-readable medium that stores a set of instructions for wireless communication by a network node. The set of instructions, when executed by one or more processors of the network node, may cause the network node to obtain, from a UE, capability information indicating a capability relating to CLI measurement resources. The set of instructions, when executed by one or more processors of the network node, may cause the network node to output a CLI measurement resource configuration in accordance with the capability information. The set of instructions, when executed by one or more processors of the network node, may cause the network node to obtain a CLI measurement report based at least in part on a CLI measurement on a CLI measurement resource configured by the CLI measurement resource configuration.

Some aspects described herein relate to an apparatus for wireless communication. The apparatus may include means for receiving a CLI measurement reporting configuration indicating a reporting resource for reporting of a CLI measurement regarding an aggressor network node or an aggressor UE associated with the aggressor network node. The apparatus may include means for transmitting a CLI measurement report on the reporting resource, the CLI measurement report indicating the CLI measurement on a measurement resource that occurs no later than a CLI reference resource that is defined by an offset relative to the reporting resource.

Some aspects described herein relate to an apparatus for wireless communication. The apparatus may include means for transmitting capability information indicating a capability relating to CLI measurement resources. The apparatus may include means for receiving a CLI measurement resource configuration in accordance with the capability information. The apparatus may include means for transmitting a CLI measurement report based at least in part on a CLI measurement on a CLI measurement resource configured by the CLI measurement resource configuration.

Some aspects described herein relate to an apparatus for wireless communication. The apparatus may include means for outputting, for a UE, a CLI measurement reporting configuration indicating a reporting resource for reporting of a CLI measurement regarding an aggressor network node or an aggressor UE associated with the aggressor network node. The apparatus may include means for obtaining a CLI measurement report on the reporting resource, the CLI measurement report indicating the CLI measurement on a measurement resource that occurs no later than a CLI reference resource that is defined by an offset relative to the reporting resource.

Some aspects described herein relate to an apparatus for wireless communication. The apparatus may include means for obtaining, from a UE, capability information indicating a capability relating to CLI measurement resources. The apparatus may include means for outputting a CLI measurement resource configuration in accordance with the capability information. The apparatus may include means for obtaining a CLI measurement report based at least in part on a CLI measurement on a CLI measurement resource configured by the CLI measurement resource configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process performed, for example, by a UE, in accordance with the present disclosure.

FIG. 11 is a diagram illustrating an example process performed, for example, by a UE, in accordance with the present disclosure.

FIG. 12 is a diagram illustrating an example process performed, for example, by a network node, in accordance with the present disclosure.

FIG. 13 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
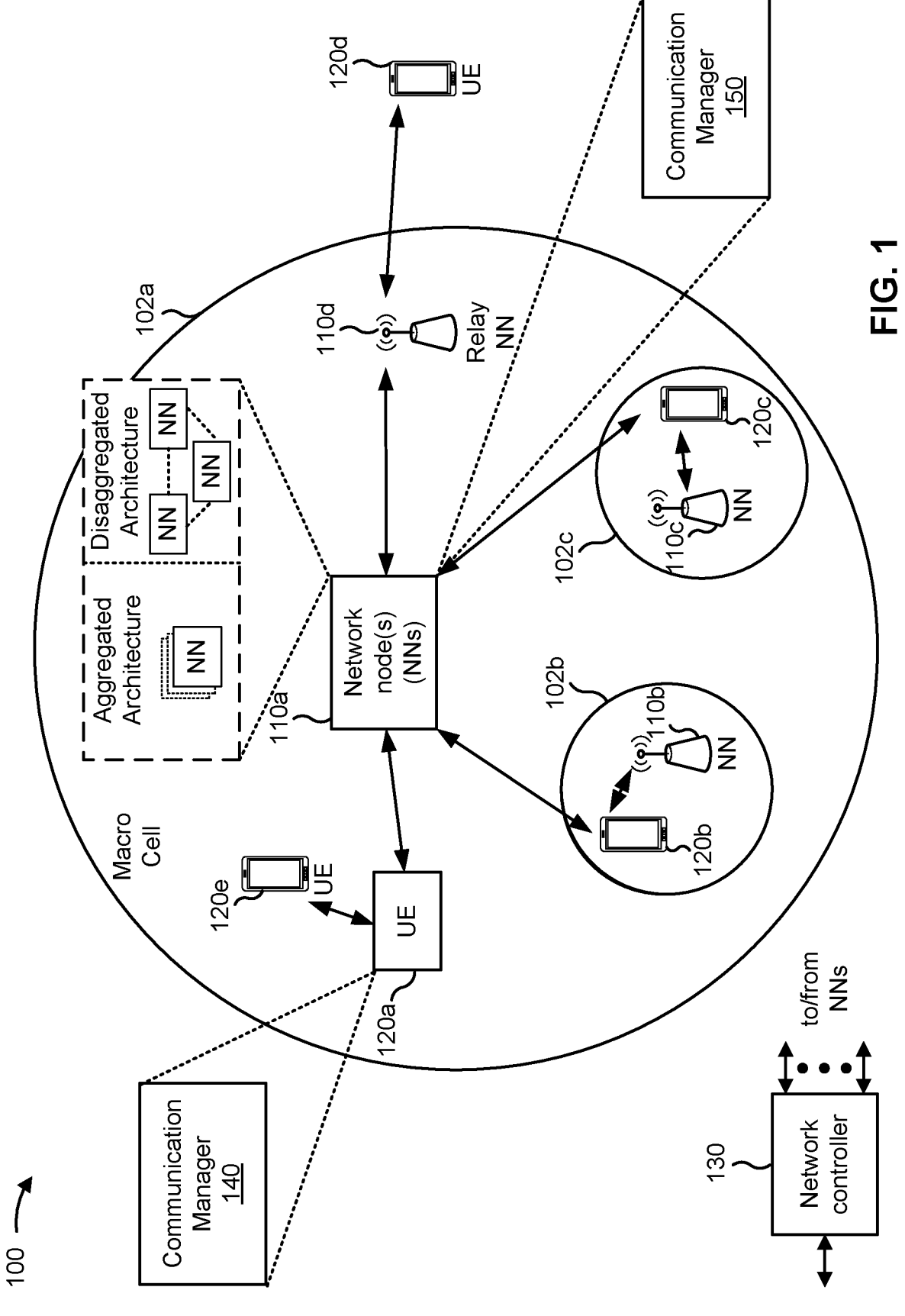
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node"

may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a CLI measurement reporting configuration indicating a reporting resource for reporting of a CLI measurement regarding an aggressor network node or an aggressor UE associated with the aggressor network node; and transmit a CLI measurement report on the reporting resource, the CLI measurement report indicating the CLI measurement on a measurement resource that occurs no later than a CLI reference resource that is defined by an offset relative to the reporting resource. As described in more detail elsewhere herein, the communication manager 140 may transmit capability information indicating a capability relating to CLI measurement resources; receive a CLI measurement resource configuration in accordance with the capability information; and transmit a CLI measurement report based at least in part on a CLI measurement on a CLI measurement resource configured by the CLI measurement resource configuration. Additionally, or alternatively, the communication manager 140 may perform one or more other operations described herein.

In some aspects, the network node 110 may include a communication manager 150. As described in more detail elsewhere herein, the communication manager 150 may output, for a UE, a CLI measurement reporting configuration indicating a reporting resource for reporting of a CLI measurement regarding an aggressor network node or an aggressor UE associated with the aggressor network node; and obtain a CLI measurement report on the reporting resource, the CLI measurement report indicating the CLI measurement on a measurement resource that occurs no later than a CLI reference resource that is defined by an offset relative to the reporting resource. As described in more detail elsewhere herein, the communication manager 150 may obtain, from a UE, capability information indicating a capability relating to CLI measurement resources; output a CLI measurement resource configuration in accordance with the capability information; and obtain a CLI measurement report based at least in part on a CLI measurement on a CLI measurement resource configured by the CLI measurement resource configuration. Additionally, or alternatively, the communication manager 150 may perform one or more other operations described herein.

As indicated above, FIG. 1 is provided as an example. Other examples may differ from what is described with regard to FIG. 1.

Figure 2:
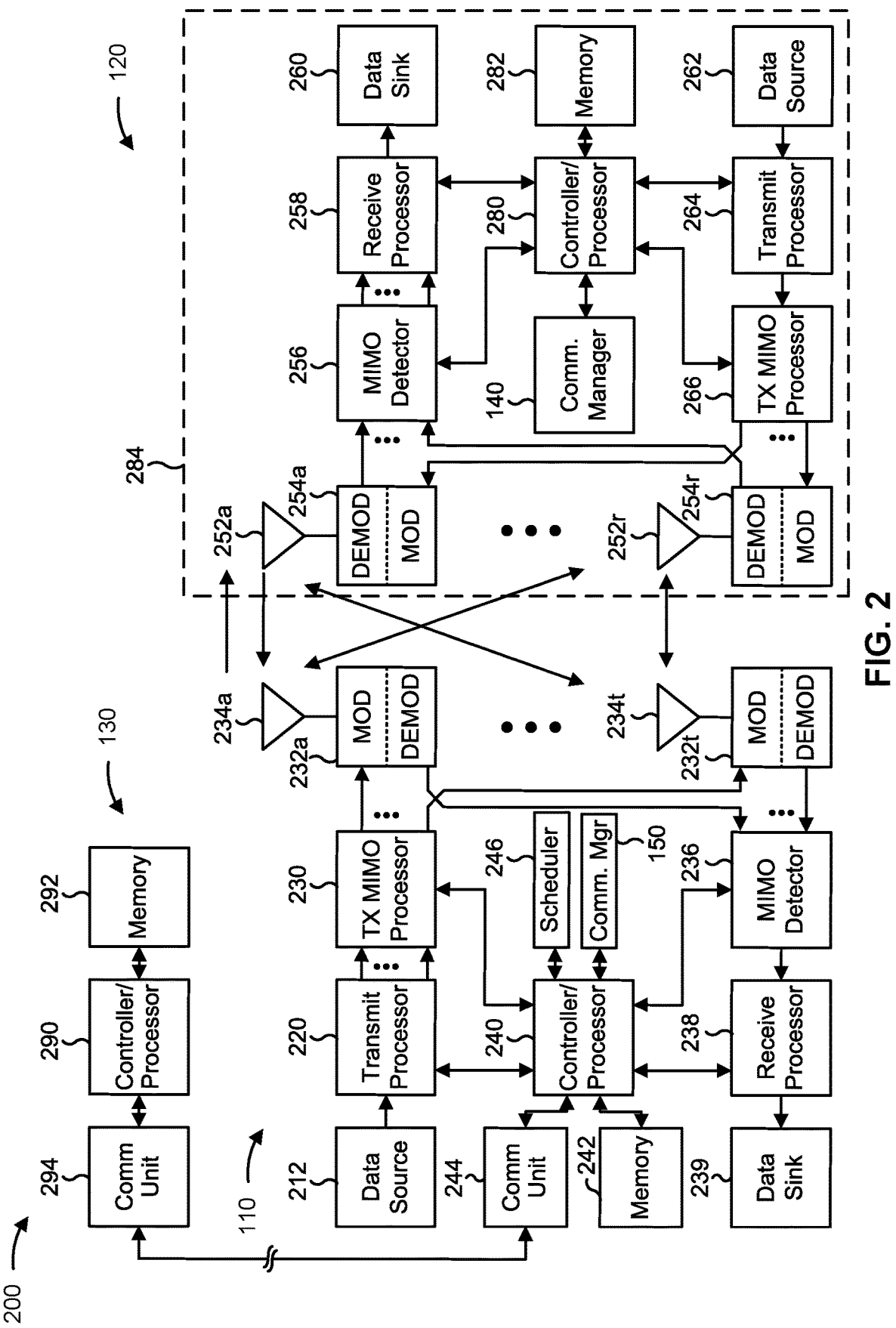
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the network node 110, the controller/processor 280 of the UE 120, and/or any other component(s) of FIG. 2 may perform one or more techniques associated with CLI measurement, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE 120 includes means for receiving (e.g., using antenna 252, MODEM 254, MIMO detector 256, receive processor 258, controller/processor 280, a transceiver, and/or the like) a CLI measurement reporting configuration indicating a reporting resource for reporting of a CLI measurement regarding an aggressor network node or an aggressor UE associated with the aggressor network node; and/or means for transmitting (e.g., using controller/processor 280, transmit processor 264, TX MIMO processor 266, MODEM 254, antenna 252, a transceiver, and/or the like) a CLI measurement report on the reporting resource, the CLI measurement report indicating the CLI measurement on a measurement resource that occurs no later than a CLI reference resource that is defined by an offset relative to the reporting resource. In some aspects, the UE 120 includes means for transmitting (e.g., using controller/processor 280, transmit processor 264, TX MIMO processor 266, MODEM 254, antenna 252, a transceiver, and/or the like) capability information indicating a capability relating to CLI measurement resources; means for receiving (e.g., using antenna 252, MODEM 254, MIMO detector 256, receive processor 258, controller/processor 280, and/or the like) a CLI measurement resource configuration in accordance with the capability information; and/or means for transmitting (e.g., using controller/processor 280, transmit processor 264, TX MIMO processor 266, MODEM 254, antenna 252, a transceiver, and/or the like) a CLI measurement report based at least in part on a CLI measurement on a CLI measurement resource configured by the CLI measurement resource configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, a transceiver, or memory 282.

In some aspects, the network node 110 includes means for outputting (e.g., using controller/processor 240, transmit processor 220, TX MIMO processor 230, MODEM 232, antenna 234, and/or the like), for a UE, a CLI measurement reporting configuration indicating a reporting resource for reporting of a CLI measurement regarding an aggressor network node or an aggressor UE associated with the aggressor network node; and/or means for obtaining a CLI measurement report on the reporting resource, the CLI measurement report indicating the CLI measurement on a measurement resource that occurs no later than a CLI reference resource that is defined by an offset relative to the reporting resource. In some aspects, the network node 110 includes means for obtaining, from a UE, capability information indicating a capability relating to CLI measurement resources; means for outputting (e.g., using controller/processor 240, transmit processor 220, TX MIMO processor 230, MODEM 232, antenna 234, and/or the like) a CLI measurement resource configuration in accordance with the capability information; and/or means for obtaining a CLI measurement report based at least in part on a CLI measurement on a CLI measurement resource configured by the CLI measurement resource configuration. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
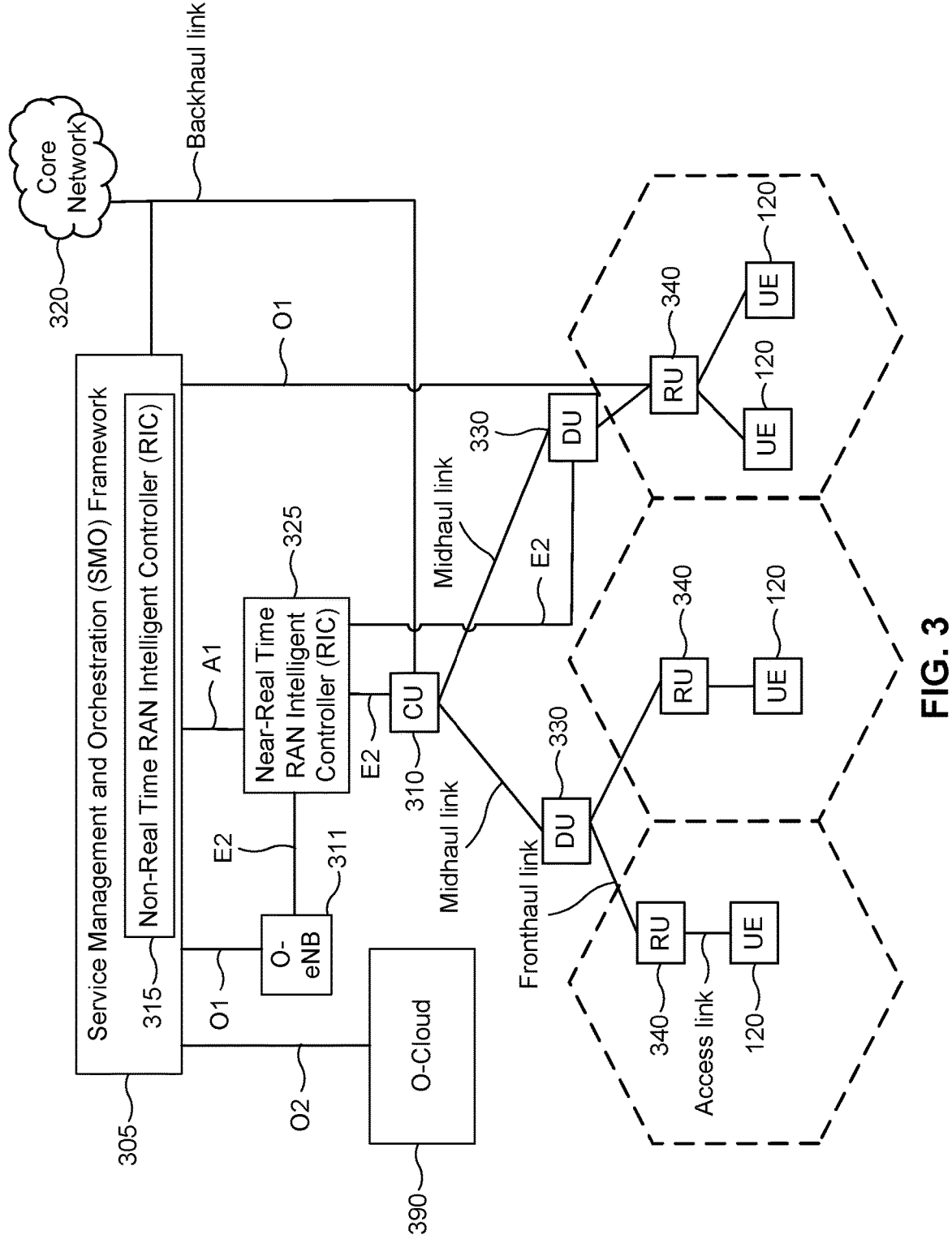
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface).

For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
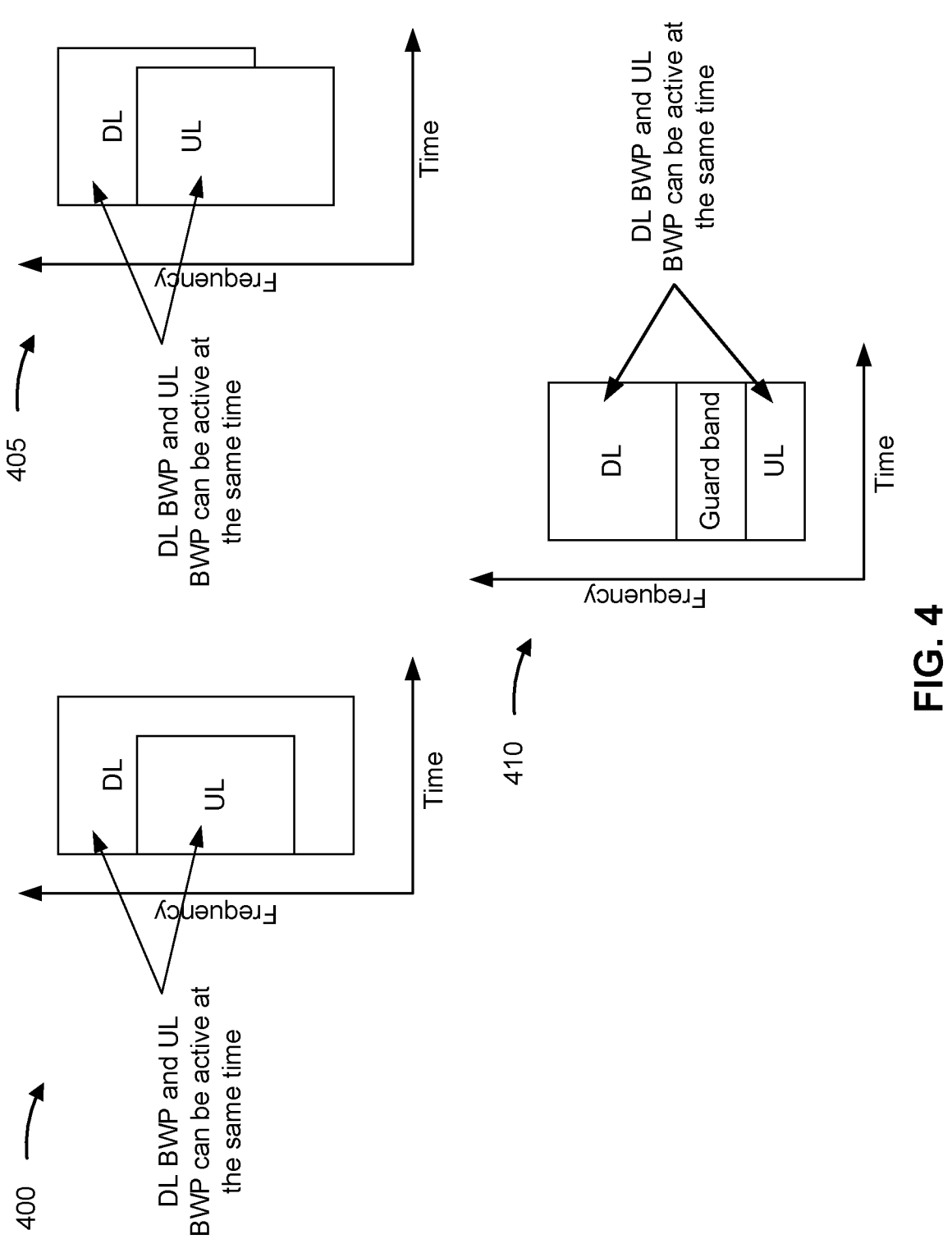
FIG. 4 is a diagram illustrating examples of full-duplex communication in a wireless network, in accordance with the present disclosure.

FIG. 4 is a diagram illustrating examples 400, 405, and 410 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 4, examples 400 and 405 show examples of in-band full-duplex (IBFD) communication. In IBFD, a UE may transmit an uplink communication to a network node and receive a downlink communication from the network node on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, example 410 shows an example of sub-band full-duplex (SBFD) communication, which may also be referred to as "sub-band frequency division duplex (SBFDD)" or "flexible duplex." In SBFD, a UE may transmit an uplink communication to a network node and receive a downlink communication from the network node at the same time, but on different frequency resources. Alternatively, the network node may receive an uplink communication from a first UE on uplink frequency resources and may transmit a downlink communication to a second UE on downlink frequency resources. For example, the different frequency resources may be sub-bands of a frequency band, such as a time division duplexing band. In some examples, the frequency resources used for downlink communication may be separated from the frequency resources used for uplink communication, in the frequency domain, by a guard band.

SBFD and IBFD communications may cause interference. For example, a reception of a victim UE may experience interference due to a transmission of an aggressor UE or an aggressor network node, where the reception and the transmission overlap in SBFD or IBFD. Interference between a victim UE and an aggressor UE may be referred to as cross-link interference (CLI). Some techniques described herein provide determination of a measurement resource for CLI measurement based at least in part on a reference resource. Some techniques described herein provide reporting of capabilities for CLI measurement resources.

As indicated above, FIG. 4 is provided as an example. Other examples may differ from what is described with respect to FIG. 4.

Figure 5:
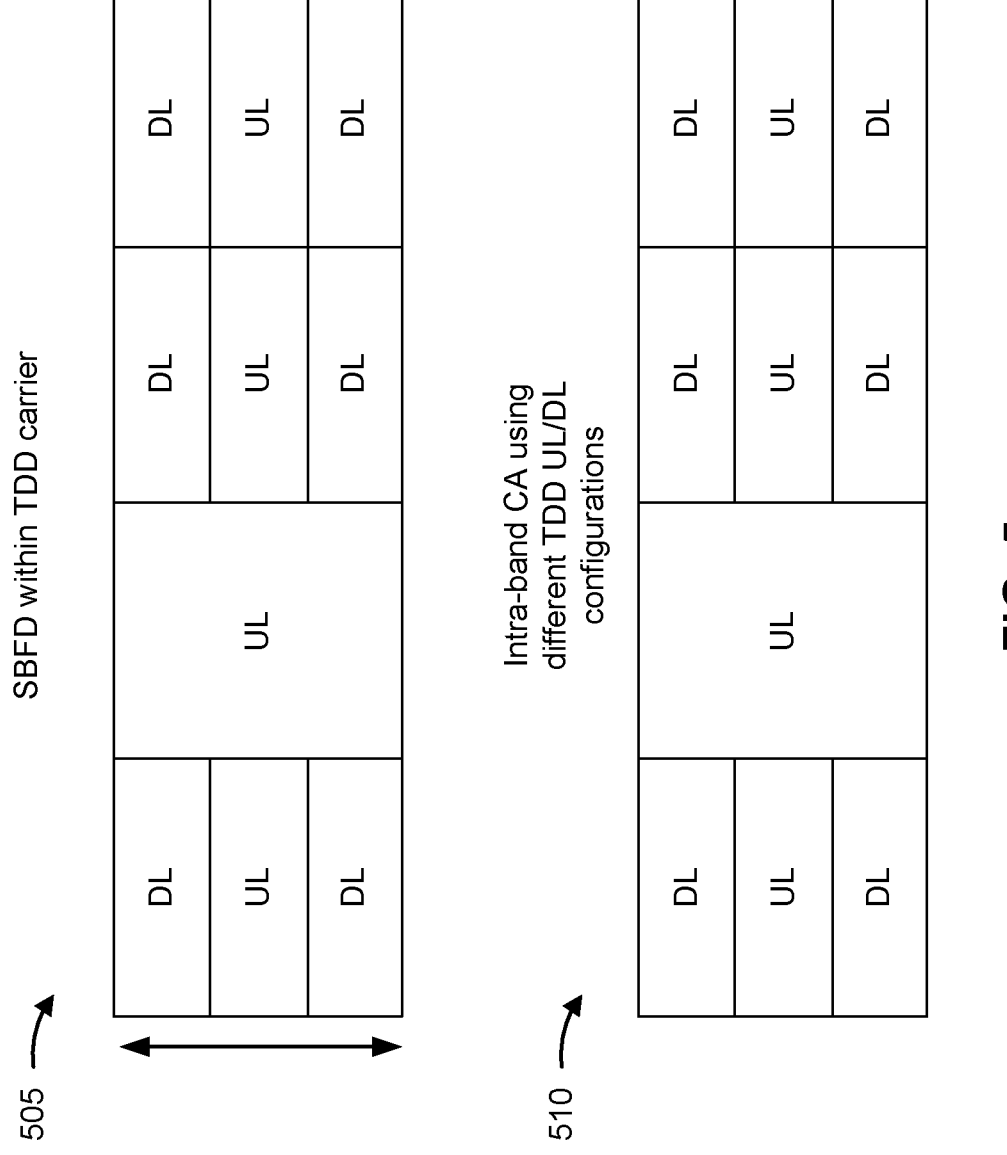
FIG. 5 is a diagram illustrating an example of subband full-duplex (SBFD) schemes, in accordance with the present disclosure.

FIG. 5 is a diagram illustrating an example 500 of SBFD schemes, in accordance with the present disclosure. Example 500 illustrates a first SBFD scheme 505 and a second SBFD scheme 510. The first SBFD scheme 505 provides SBFD within a time division duplexing (TDD) carrier, in which a single CC's bandwidth is divided into non-overlapping UL and DL subbands. The second SBFD scheme 510 provides SBFD across multiple carriers (for example, intra-band carrier aggregation (CA)) using different TDD configurations. For example, CC1 and CC3 may have the same TDD configuration (e.g., DUDD, indicating a first slot is a DL slot, a second slot is a UL slot, and a third slot and a fourth slot are DL slots) and CC2 may be configured as an uplink carrier.

A TDD configuration may include a cell-common TDD configuration or a dedicated TDD configuration. A TDD configuration may be semi-statically configured via RRC signaling. A cell-common TDD configuration may be provided via an RRC parameter tdd-UL-DL-Configuration-Common, and may apply to all UEs associated with a cell. A dedicated TDD configuration may be provided via an RRC parameter tdd-UL-DL-ConfigurationDedicated and may apply to a UE to which the dedicated TDD configuration is directed. A resource can also be semi-statically configured as a flexible resource (e.g., having a flexible resource type), referred to herein as an RRC-F resource. After configuration as a semi-statically configured resource, a flexible resource (e.g., RRC-F), such as a symbol of a slot, can be subsequently indicated as an uplink resource (e.g., a resource having an uplink resource type), a downlink resource (e.g., a resource having a downlink resource type), or a flexible resource by a slot format indicator (SFI). An SFI includes an index into a table that identifies how each symbol number in a slot should be configured (e.g., as an uplink resource, a downlink resource, or a flexible resource). A flexible resource indicated by an SFI as an uplink resource (e.g., as having an uplink resource type) is referred to as an SFI-U resource. A flexible resource indicated by an SFI as a downlink resource (e.g., as having a downlink resource type) is referred to as an SFI-D resource. A flexible resource indicated by an SFI as a flexible resource is referred to as an SFI-F resource. An SFI-D resource (or more generally, a resource having a downlink resource type) may have a downlink link direction. An SFI-U resource (or more generally, a resource having an uplink resource type) may have an uplink link direction.

As indicated above, FIG. 5 is provided as an example. Other examples may differ from what is described with regard to FIG. 5.

FIGS. 6A-6D are diagrams illustrating examples 600, 610, 620, 630 of FD communication in accordance with the present disclosure. An FD communication is a communication that utilizes overlapped time resources at a single node (such as a UE or a network node) for transmission and reception. For example, a UE or a network node may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states defining different beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant.

Figures 6A, 6B, 6C, 6D:
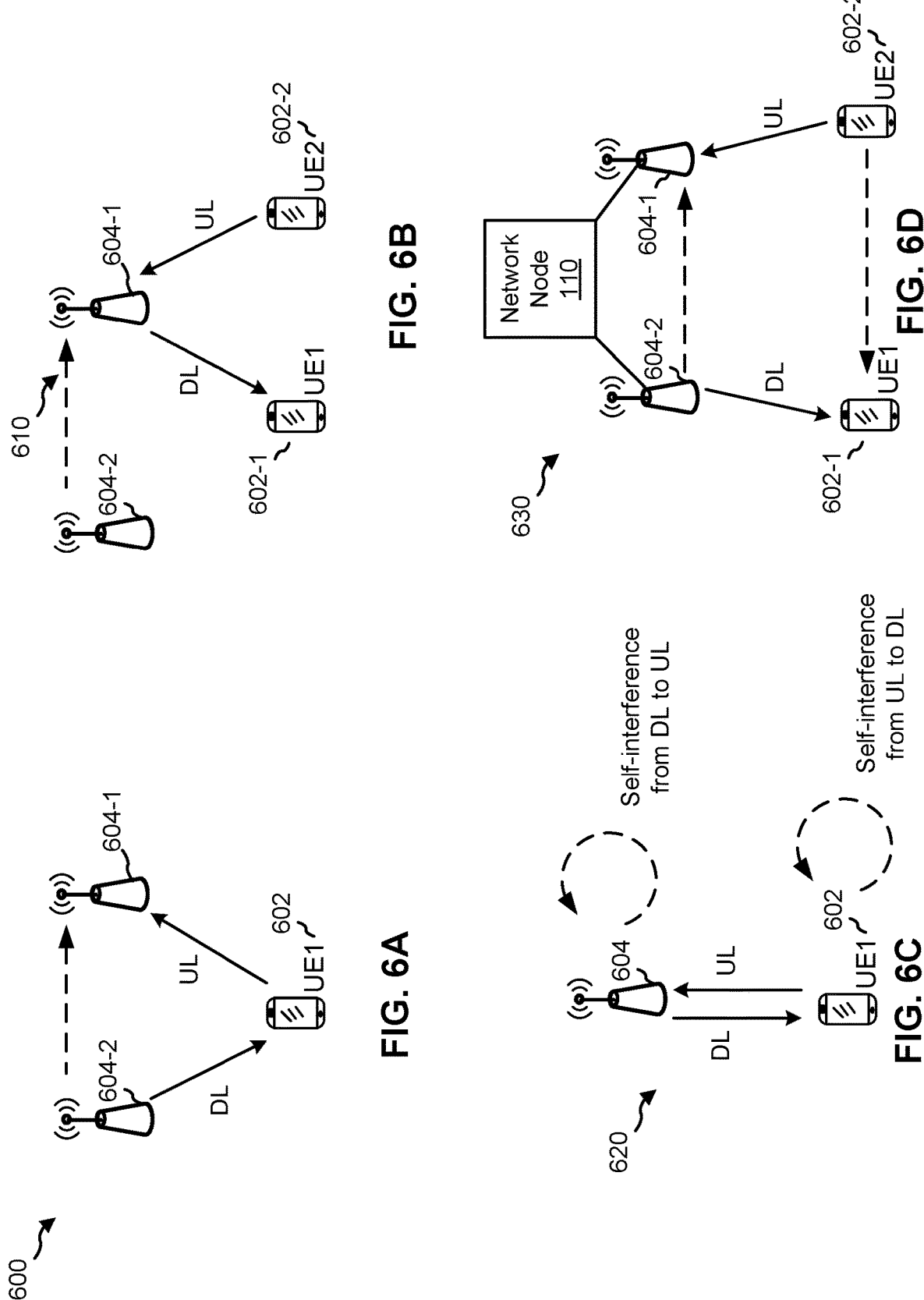
FIGS. 6A-6D are diagrams illustrating examples of full-duplex (FD) communication, in accordance with the present disclosure.

The example 600 of FIG. 6A includes a UE1 602 and two network nodes (e.g., TRPs) 604-1, 604-2, wherein the UE1 602 is sending uplink transmissions to the network node 604-1 and is receiving downlink transmissions from the network node 604-2. In some aspects, the network node 604 described in connection with FIGS. 6A-4D may be a base station, a TRP associated with (e.g., managed by) a network node, an RU, a DU, or a similar network node. In some aspects, the UEs 602 described in connection with FIGS. 6A-4D may be the UE 120 described in connection with FIGS. 1, 2, and 3, or a similar UE. In the example 600 of FIG. 6A, FD is enabled for the UE1 602, but not for the network nodes 604-1, 604-2. Thus, the network nodes 604-1 and 604-2 are half duplex (HD) network nodes.

The example 610 of FIG. 6B includes two UEs, UE1 602-1 and UE2 602-2, a network node 604-1, and a network node 604-2. The UE1 602-1 is receiving a downlink transmission from the network node 604-1 and the UE2 602-2 is transmitting an uplink transmission to the network node 604-1. In the example 610 of FIG. 6B, FD is enabled for the network node 604-1, but not for the UE1 602-1 and UE2 602-2. Thus, the UE 1 602-1 and UE2 602-2 are half duplex UEs.

The example 620 of FIG. 6C includes a UE1 602 and a network node 604, wherein the UE1 602 is receiving a downlink transmission from the network node 604 and the UE1 602 is transmitting an uplink transmission to the network node 604. In the example 620 of FIG. 6C, FD is enabled for both the UE 1 602 and the network node 604. In the example 620 of FIG. 6C, the UE1 602 and the network node 604 communicate using a beam pair. A beam pair may include a downlink beam and an uplink beam. For example, a UE1 602 may use a beam pair that includes a downlink beam (that is, a receive beam) at the UE1 602 and an uplink beam (that is, a transmit beam) at the UE1 602 to communicate with the network node 604. The network node 604 may use a downlink beam (that is, a transmit beam) at the network node 604 to transmit communications received via the UE1 602's downlink beam, and may use an uplink beam (that is, a receive beam) at the network node 604 to receive communications transmitted via the UE1 602's uplink beam.

The example 630 of FIG. 6D includes a network node 110 and two network nodes 604-1 and 604-2 associated with a cell (such as, e.g., a cell 102 described in connection with FIG. 1). The network nodes 604-1 and 604-2 may be either co-located (e.g., located at the same device, such as at the network node 110 or other device), or may be non-co-located (e.g., located apart from one another and/or from the network node 110, and thus may be standalone devices).

In FIGS. 6A-6D, interference is indicated by dashed lines. Interference can occur between network nodes of examples 600, 610, 620, 630 (referred to as cross-link interference (CLI)). In FIG. 6A, network node 604-2's downlink transmission interferes with network node 604-1's uplink transmission. In FIG. 6B, network node 604-1's uplink reception may be subject to interference from a transmission by a network node 604-2. CLI between network nodes 604 is referred to herein as inter-network node CLI. In some examples in FIG. 6B, UE2 602-2's uplink transmission may interfere with UE1 602-1's downlink transmission (not shown). Similarly, in FIG. 6D, UE2 602-2's uplink transmission interferes with UE1 602-1's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 602 (from an uplink transmission to a downlink reception) and at a network node 604 (from a downlink transmission to an uplink reception) are shown in FIG. 6C. It should be noted that the above-described CLI and self-interference conditions can occur in HD deployments and in FD deployments.

Some network nodes support SBFD communication, as described elsewhere herein. SBFD communication may involve FD communication at a network node and HD communication at UEs, as shown, for example, in FIG. 6B.

In some cases, CLI and/or inter-cell inter-node interference may result from a conflict between resource types due to dynamic TDD. "Dynamic TDD" refers to a system in which a first network node and a second network node each perform dynamic configuration and/or reconfiguration of resource types of their respective carriers (e.g., cells). For example, a first network node may configure a first set of resources as "DDUUD" and a second network node may configure a second set of resources as "DDDUU". If the first network node and the second network node are within a threshold distance of one another, or if coverage areas of the first network node and the second network node overlap one another, then interference may occur if the first set of resources is time-overlapped with the second set of resources. For example, a third resource of the first set of resources and the second set of resources is configured as an uplink resource by the first network node and as a downlink resource by the second network node, so interference may occur at a UE associated with the second network node due to an uplink transmission on the first set of resources. As another example, a fifth resource of the first set of resources and the second set of resources is configured as a downlink resource by the first network node and as an uplink resource by the second network node, so interference may occur at a UE associated with the first network node due to an uplink transmission on the second set of resources.

Thus, a UE can be subject to inter-cell interference from other network nodes, intra-cell CLI from UEs in the same cell as the UE, inter-cell CLI from UEs in adjacent cells, and self-interference due to FD communication at the UE.

As indicated above, FIGS. 6A-6D are provided as examples. Other examples may differ from what is described with regard to FIGS. 6A-6D.

A UE may experience CLI due to transmissions of other UEs. It may be beneficial for a network node (e.g., a gNB) to identify CLI, a victim UE experiencing the CLI, and/or an aggressor UE (and/or corresponding aggressor network node) causing the CLI. To that end, a network node may configure a UE (e.g., a victim UE) to measure CLI and report CLI measurements. For example, the network node may configure an aggressor UE with a reference signal resource (e.g., a non-zero-power sounding reference signal (NZP-SRS) resource such as a periodic, aperiodic, or semi-persistent reference signal resource), and may configure a victim UE with one or more measurement resources (e.g., CLI measurement resources) on which to perform a CLI measurement (e.g., a reference signal received power (RSRP) measurement, a signal-to-interference-plus-noise ratio (SINR) measurement, or the like). The one or more measurement resources can be periodic, aperiodic, or semi-persistent. In some examples, the one or more measurement resources may align with the reference signal resource such that the victim UE measures a reference signal transmitted by the aggressor UE on the reference signal resource. The network node may also configure the victim UE with a CLI measurement reporting configuration indicating a reporting resource for reporting of the CLI measurement. The CLI measurement is performed on a measurement resource preceding the reporting resource.

However, a CLI measurement, and preparation of a CLI report indicating the CLI measurement, may involve a length of processing time at the UE. If the CLI measurement is performed too close, in time, to the reporting resource, then the UE may not have sufficient time to prepare a CLI report indicating the CLI measurement, which may stress processing resources of the UE and/or make CLI reporting impossible in this situation. Furthermore, not all measurement resources may be suitable for CLI measurement. As just one example, in a dynamic TDD deployment, a measurement resource may occur in a slot that overlaps a slot, of an aggressor UE, with the same resource type (e.g., uplink or downlink), such that no CLI occurs on the measurement resource. This may lead to inaccurate reporting of CLI, which may cause misconfiguration of the network and increased CLI in other resources. Still further, different UEs may have different capabilities regarding measurement resources, so a configuration of measurement resources that does not take into account a UE's capabilities may lead to inefficient utilization of measurement resources or failure to measure and report CLI.

Some techniques described herein provide an offset that defines a CLI reference resource relative to a reporting resource, such that a UE (e.g., a victim UE) can measure CLI on a measurement resource that occurs no later than the CLI reference resource. For example, the UE may receive a CLI measurement reporting configuration indicating a reporting resource for reporting of a CLI measurement regarding an aggressor network node or an aggressor UE associated with the aggressor network node. The UE may transmit a CLI measurement report on the reporting resource. The CLI measurement report may indicate the CLI measurement on a measurement resource that occurs no later than a CLI reference resource that is defined by an offset relative to the reporting resource. Thus, the UE and the network node may ensure that a time separation between the measurement resource and the reporting resource provides sufficient time to process the CLI measurement and prepare the CLI measurement report, thereby enabling reliable CLI reporting and reducing stress on processing resources of the UE.

In some aspects, the measurement resource is based at least in part on a valid time resource, such as a valid slot. For example, the offset may be defined as a smallest value that is greater than or equal to $X*2^\mu$ and that causes the CLI reference resource to occur on a valid slot. X may be based at least in part on how many measurement resources are configured (e.g., 4 if a single measurement resource is configured and 5 if multiple measurement resources are configured, in one example), and µ is a numerology, as described in more detail elsewhere herein. In some examples, the valid slot may be defined as an SBFD slot or as a downlink slot overlapping with a slot configured as an uplink slot for an aggressor network node (that is, a dynamic TDD resource having different link directions at adjacent network nodes), which improves accuracy of reporting of CLI, thereby reducing misconfiguration of the network and enabling the reduction of CLI in other resources.

Some techniques described herein provide reporting of capability information indicating a capability relating to CLI measurement resources. For example, a UE may transmit capability information indicating a capability relating to CLI measurement resources. The UE may receive a CLI measurement resource configuration in accordance with the capability information. The UE may transmit a CLI measurement report based at least in part on a CLI measurement on a CLI measurement resource configured by the CLI measurement resource configuration. The capability information may indicate, for example, a maximum number of configured CLI measurement resources per component carrier or in active bandwidth parts across all component carriers and/or a maximum number of simultaneously active CLI measurement resources per component carrier. In some aspects, the capability information may relate to a number of CLI measurement ports that can be configured or simultaneously active for the UE. Thus, the UE can report capability information indicating capabilities of the UE relating to CLI measurement resources. The network node can configure CLI measurement resources in accordance with the capability information. In this way, conformance with UE capabilities is improved and efficiency of utilization of CLI measurement resources is improved.

Figure 7:
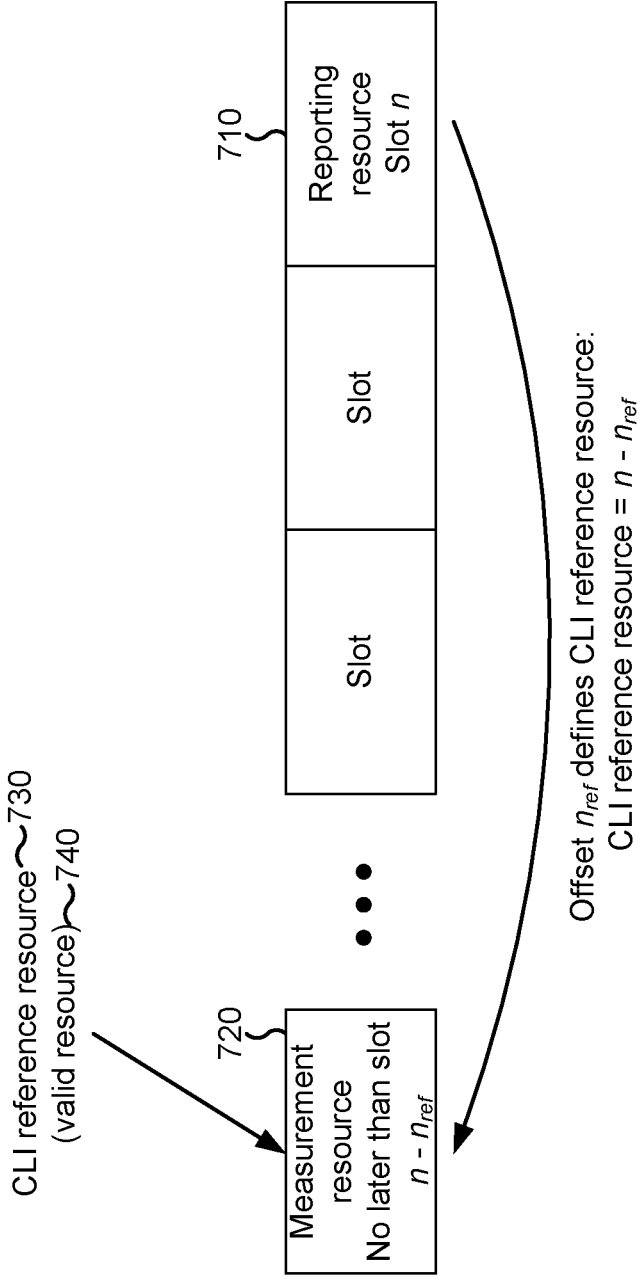
FIG. 7 is a diagram illustrating an example of an offset that indicates a cross-link interference (CLI) reference resource relative to a reporting resource, in accordance with the present disclosure.

FIG. 7 is a diagram illustrating an example 700 of an offset that indicates a CLI reference resource relative to a reporting resource, in accordance with the present disclosure. FIG. 7 shows a reporting resource (e.g., slot) 710 and a measurement resource (e.g., slot) 720. A reporting resource is a resource in which a UE is configured to transmit a CLI measurement report, such as by a CLI measurement reporting configuration. For example, a network node may output a CLI measurement reporting configuration. The CLI measurement reporting configuration may indicate one or more parameters relating to a CLI measurement report, such as one or more measurement quantities to be reported, the reporting resource (e.g., an aperiodic resource, a periodic resource, a semi-persistent resource, or a combination thereof), a configuration of the CLI measurement report, one or more measurement resources to which the CLI measurement reporting configuration is linked (e.g., such that the UE performs CLI measurements on the one or more linked measurement resources), or the like.

A measurement resource is a resource in which a UE is configured to perform a CLI measurement, such as by a CLI measurement resource configuration. The CLI measurement resource configuration may indicate one or more measurement resources (e.g., an aperiodic resource, a periodic resource, a semi-persistent resource, or a combination thereof). In some aspects, the measurement resource may be aligned (e.g., in time and/or frequency) with a reference signal resource configured at an aggressor UE, such that the UE (e.g., the victim UE) can measure CLI from the aggressor UE. In some examples, the UE may be configured with multiple reference resources that may be distributed in time and/or frequency.

As shown by reference number 730, the measurement resource may be associated with a CLI reference resource. For example, the measurement resource may be the CLI reference resource or may be linked to the CLI reference resource. A CLI reference resource (e.g., slot) is a resource that indicates a latest resource (e.g., slot) in which a CLI measurement can be performed for transmission of a CLI measurement report including measurement information (e.g., a value of the CLI measurement) regarding the CLI measurement. For example, a CLI reference resource may provide a minimum time separation between a measurement resource and a corresponding reporting resource on which a CLI measurement report regarding the measurement resource is transmitted.

The CLI reference resource may be defined by an offset relative to the reporting resource. The offset is represented herein by $n_{ref}$. The offset may indicate a number of resources (e.g., a number of slots). The CLI reference resource may occur at resource $n-n_{ref}$, where resource n is the reporting resource.

The offset may be based at least in part on a downlink bandwidth part numerology, µ, of the UE. A numerology is a configured value that indicates parameters relating to a physical channel structure of the UE. For example, the numerology may indicate a subcarrier spacing of the UE (e.g., a bandwidth part of the UE, a resource of the UE), a cyclic prefix length, and/or other parameters. A numerology (such as a downlink bandwidth part numerology, which is a numerology configured for downlink communications on a particular bandwidth part) may be represented as an integer index (e.g., 0, 1, 2, 3, 4, and so on). In some aspects, the offset may be derived from the downlink bandwidth part numerology, as described in more detail below.

As shown by reference number 740, the CLI reference resource may be provided on a valid resource. For example, the offset may be selected or configured such that the CLI reference resource (and therefore, the measurement resource corresponding to the reporting resource) occurs on a valid resource (e.g., a valid slot). In some aspects, any downlink slot may be considered a valid slot, which increases the number of resources that can be used as CLI measurement resources. In some aspects, only downlink slots overlapping with slots configured as uplink slots for the aggressor network node are valid slots. For example, a slot may be considered a valid slot for a CLI reference resource if the slot is configured as a downlink slot for a serving cell of the UE, and if the slot at least partially overlaps in time with a slot configured by an adjacent network node (e.g., an aggressor network node) as an uplink slot (such as in connection with a dynamic TDD configuration). Thus, accuracy of CLI measurement on the measurement resource is improved relative to a case where any downlink resource is considered a valid resource. In some aspects, an SBFD resource may be considered a valid resource. For example, any SBFD resource (e.g., any resource including an uplink subband and a downlink subband) may be considered a valid resource. Thus, accuracy of CLI measurement on the measurement resource is improved relative to a case where any downlink resource is considered a valid resource.

In some aspects, the offset may be based at least in part on a valid resource and a numerology. For example (e.g., for periodic CLI reporting or semi-persistent CLI reporting, in some examples), if a single resource is configured as a measurement resource, $n_{ref}$ may be a smallest value (e.g., a smallest number of slots) greater than or equal to $4 \cdot 2^{\mu}$ for which the measurement resource (defined by $n - n_{ref}$) corresponds to a valid resource. For another example (e.g., for periodic CLI reporting or semi-persistent CLI reporting, in some examples), if multiple resources are configured as measurement resources, $n_{ref}$ may be a smallest value (e.g., a smallest number of slots) greater than or equal to 5-2 for which the measurement resource (defined by $n - n_{ref}$) corresponds to a valid resource.

As indicated above, FIG. 7 is provided as an example. Other examples may differ from what is described with regard to FIG. 7.

Figure 8:
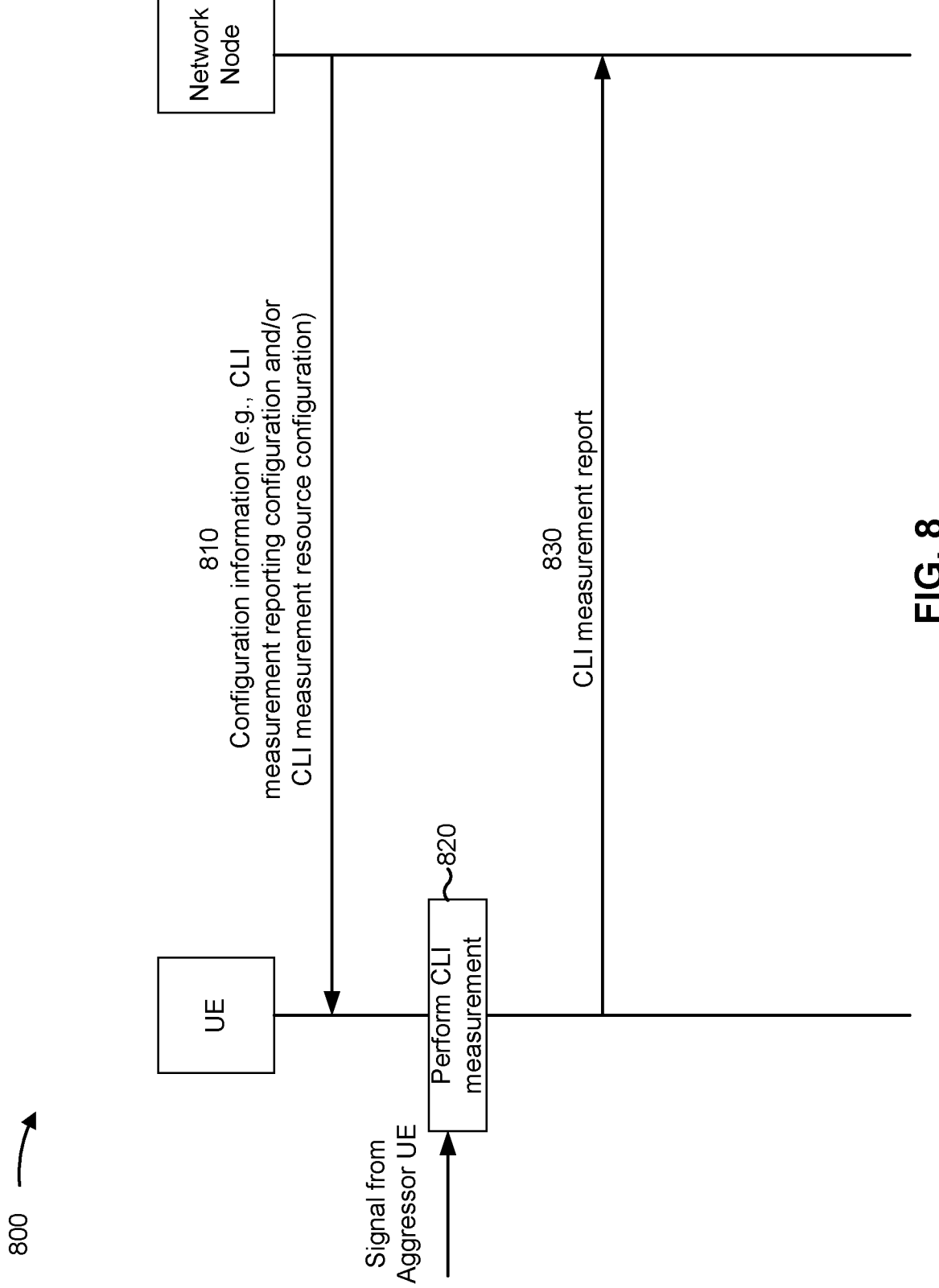
FIG. 8 is a diagram illustrating an example of signaling associated with CLI measurement reporting in accordance with an offset, in accordance with the present disclosure.

FIG. 8 is a diagram illustrating an example 800 of signaling associated with CLI measurement reporting in accordance with an offset, in accordance with the present disclosure. As shown, example 800 includes a UE (e.g., UE 120) and a network node (e.g., network node 110).

As shown by reference number 810, the network node may output (e.g., transmit, provide to another network node for transmission), and the UE may receive, such as via a transceiver, configuration information. In some aspects, the configuration information may include a CLI measurement reporting configuration that indicates at least one reporting resource. In some aspects, the configuration information may include a CLI measurement resource configuration that indicates at least one measurement resource. In some aspects, the configuration information may indicate a numerology, which the UE may use to determine a CLI reference resource, as described elsewhere herein.

As shown by reference number 820, the UE may perform, such as via a transceiver, the CLI measurement. For example, the UE may perform a CLI measurement on a measurement resource. The measurement resource may occur no later than a CLI reference resource. For example, the measurement resource may be the CLI reference resource. The UE may perform the CLI measurement based at least in part on a transmission by another UE (e.g., an aggressor UE). For example, the UE may perform the CLI measurement on a resource corresponding to (e.g., overlapping in time and frequency) a reference signal resource of an aggressor UE.

As shown by reference number 830, the UE may transmit, such as via a transceiver, a CLI measurement report. The CLI measurement report may indicate the CLI measurement. For example, the CLI measurement report may include a measurement value determined by performing the CLI measurement. The network node may obtain (e.g., receive or obtain from another network node) the CLI measurement report.

As indicated above, FIG. 8 is provided as an example. Other examples may differ from what is described with regard to FIG. 8.

Figure 9:
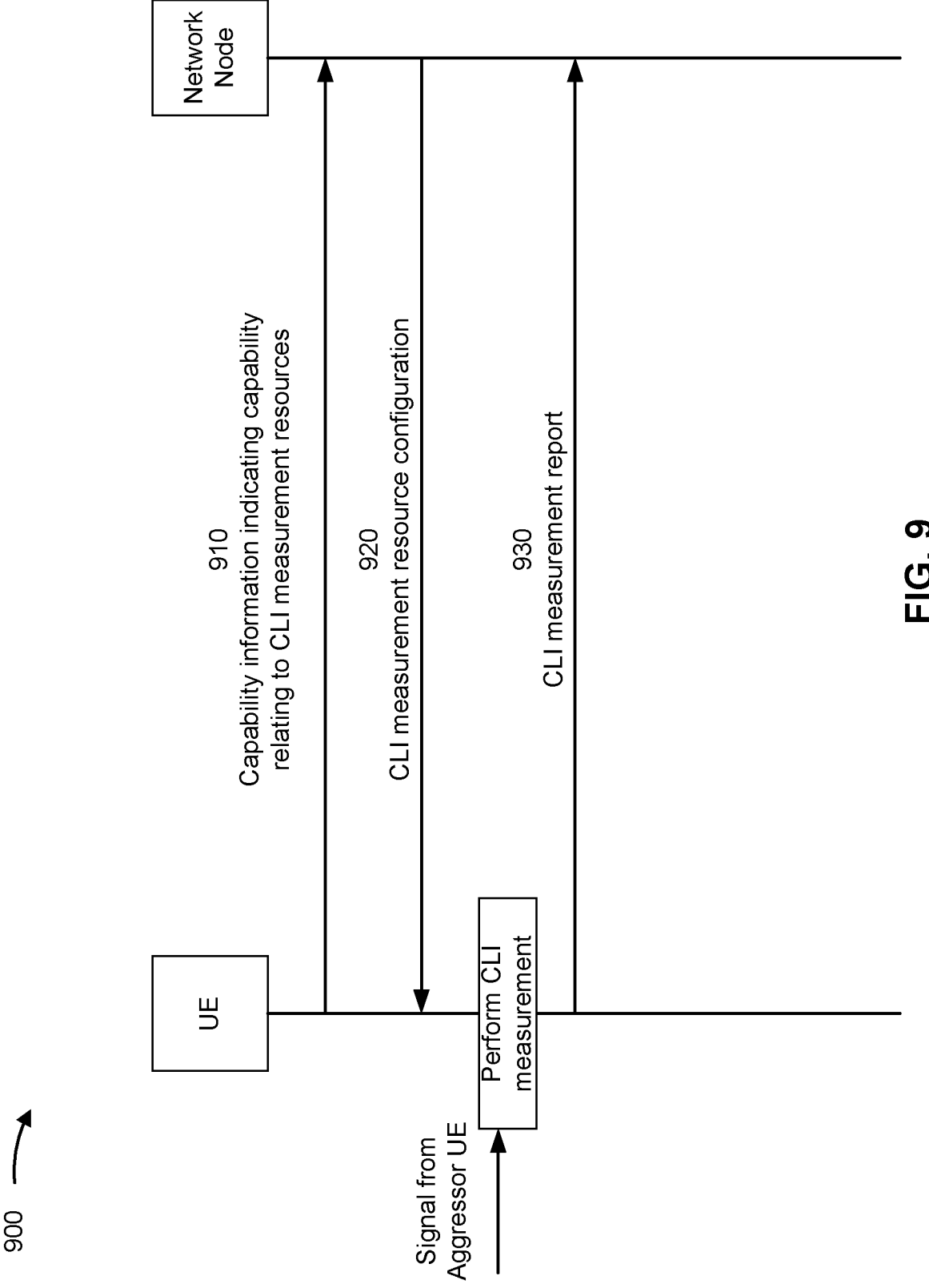
FIG. 9 is a diagram illustrating an example of signaling associated with CLI measurement resource capability signaling, in accordance with the present disclosure.

FIG. 9 is a diagram illustrating an example 900 of signaling associated with CLI measurement resource capability signaling, in accordance with the present disclosure. As shown, example 900 includes a UE (e.g., UE 120) and a network node (e.g., network node 110).

As shown by reference number 910, the UE may transmit, such as via a transceiver, and the network node may obtain (e.g., receive from the UE or obtain from another network node), capability information. The capability information may indicate a capability relating to CLI measurement resources. For example, the capability information may include one or more information elements that indicate one or more capabilities relating to CLI measurement resources.

In some aspects, the capability information indicates a maximum number of configured CLI measurement resources per component carrier (CC). For example, the capability information may indicate a maximum number of configured CLI measurement resources per CC in a given slot.

In some aspects, the capability information indicates a maximum number of configured CLI measurement resources in active bandwidth parts across all component carriers of the UE. For example, the capability information may indicate a maximum number of configured CLI measurement resources in active bandwidth parts (e.g., bandwidth parts that have been configured and activated for downlink or uplink communication or signaling).

In some aspects, the capability information indicates a maximum number of simultaneously active CLI measurement resources per component carrier. For example, the capability information may indicate a maximum number of CLI measurement resources per CC in a given slot or occurring at a same time.

In some aspects, the capability information indicates a maximum number of ports for configured CLI measurement resources per component carrier. For example, a CLI measurement resource may include a number of ports, which may indicate a number of resource elements on which the CLI measurement is performed. The capability information may indicate a maximum number of ports for all configured CLI measurement resources per component carrier. In some aspects, the capability information indicates a maximum number of ports for configured CLI measurement resources in active bandwidth parts across all component carriers of the UE. In some aspects, the capability information indicates a maximum number of ports in simultaneously active CLI measurement resources per component carrier.

As shown by reference number 920, the network node may output, and the UE may receive, such as via a transceiver, a CLI measurement resource configuration. The CLI measurement resource configuration may be in accordance with the capability information. For example, the CLI measurement resource configuration may configure, in a CC, up to a maximum number of configured CLI measurement resources per CC.

As another example, the CLI measurement resource configuration may configure, across all CCs, up to a maximum number of configured CLI measurement resources in active bandwidth parts. As another example, the CLI measurement resource may configure up to a maximum number of configured CLI measurement resource ports (e.g., on a single CC or across all active bandwidth parts and CCs). As yet another example, the CLI measurement resource configuration may configure up to a maximum number of simultaneously active CLI measurement resources or CLI measurement resource ports.

As shown by reference number 930, the UE may transmit, such as via a transceiver, and the network node may obtain (e.g., receive or obtain from another network node), a CLI measurement report. The CLI measurement report may be based at least in part on a CLI measurement on a CLI measurement resource configured by the CLI measurement resource configuration shown by reference number 920. For example, the UE may perform the CLI measurement, and may report a measurement value of the CLI measurement in the CLI measurement report.

As indicated above, FIG. 9 is provided as an example. Other examples may differ from what is described with regard to FIG. 9.

FIG. 10 is a diagram illustrating an example process 1000 performed, for example, by a UE, in accordance with the present disclosure. Example process 1000 is an example where the UE (e.g., UE 120) performs operations associated with a reference resource for cross-link interference measurement.

As shown in FIG. 10, in some aspects, process 1000 may include receiving a CLI measurement reporting configuration indicating a reporting resource for reporting of a CLI measurement regarding an aggressor network node or an aggressor UE associated with the aggressor network node (block 1010). For example, the UE (e.g., using communication manager 140 and/or reception component 1402, depicted in FIG. 14) may receive, such as via a transceiver, a CLI measurement reporting configuration indicating a reporting resource for reporting of a CLI measurement regarding an aggressor network node or an aggressor UE associated with the aggressor network node, as described above, for example, with reference to FIGS. 7 and 8.

As further shown in FIG. 10, in some aspects, process 1000 may include transmitting a CLI measurement report on the reporting resource, the CLI measurement report indicating the CLI measurement on a measurement resource that occurs no later than a CLI reference resource that is defined by an offset relative to the reporting resource (block 1020). For example, the UE (e.g., using communication manager 140 and/or transmission component 1404, depicted in FIG. 14) may transmit, such as via a transceiver, a CLI measurement report on the reporting resource, the CLI measurement report indicating the CLI measurement on a measurement resource that occurs no later than a CLI reference resource that is defined by an offset relative to the reporting resource, as described above, for example, with reference to FIGS. 7 and 8.

Process 1000 may include additional aspects, such as any single aspect or any combination of aspects described below and/or in connection with one or more other processes described elsewhere herein.

In a first aspect, the offset is based at least in part on a downlink bandwidth part numerology, p, of the UE.

In a second aspect, alone or in combination with the first aspect, the offset is a smallest value that is greater than or equal to $X*2^\mu$ and that causes the CLI reference resource to occur on a valid slot.

In a third aspect, alone or in combination with one or more of the first and second aspects, any downlink slot is a valid slot.

In a fourth aspect, alone or in combination with one or more of the first through third aspects, only downlink slots overlapping with slots configured as uplink slots for the aggressor network node are valid slots.

In a fifth aspect, alone or in combination with one or more of the first through fourth aspects, any sub-band full-duplex slot is a valid slot.

In a sixth aspect, alone or in combination with one or more of the first through fifth aspects, based at least in part on multiple measurement resources are configured for the CLI measurement, X is 5.

In a seventh aspect, alone or in combination with one or more of the first through sixth aspects, based at least in part on a single measurement resource is configured for the CLI measurement, X is 4.

In an eighth aspect, alone or in combination with one or more of the first through seventh aspects, process 1000 includes performing, such as via a transceiver, the CLI measurement based at least in part on a signal of the aggressor UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a UE, in accordance with the present disclosure. Example process 1100 is an example where the UE (e.g., UE 120) performs operations associated with a capability for cross-link interference measurement.

As shown in FIG. 11, in some aspects, process 1100 may include transmitting capability information indicating a capability relating to CLI measurement resources (block 1110). For example, the UE (e.g., using communication manager 140 and/or transmission component 1404, depicted in FIG. 14) may transmit, such as via a transceiver, capability information indicating a capability relating to CLI measurement resources, as described above, for example, with reference to FIG. 9.

As further shown in FIG. 11, in some aspects, process 1100 may include receiving a CLI measurement resource configuration in accordance with the capability information (block 1120). For example, the UE (e.g., using communication manager 140 and/or reception component 1402, depicted in FIG. 14) may receive, such as via a transceiver, a CLI measurement resource configuration in accordance with the capability information, as described above, for example, with reference to FIG. 9.

As further shown in FIG. 11, in some aspects, process 1100 may include transmitting a CLI measurement report based at least in part on a CLI measurement on a CLI measurement resource configured by the CLI measurement resource configuration (block 1130). For example, the UE (e.g., using communication manager 140 and/or transmission component 1404, depicted in FIG. 14) may transmit, such as via a transceiver, a CLI measurement report based at least in part on a CLI measurement on a CLI measurement resource configured by the CLI measurement resource configuration, as described above, for example, with reference to FIG. 9.

Process 1100 may include additional aspects, such as any single aspect or any combination of aspects described below and/or in connection with one or more other processes described elsewhere herein.

In a first aspect, the capability information indicates a maximum number of configured CLI measurement resources per component carrier.

In a second aspect, alone or in combination with the first aspect, the capability information indicates a maximum number of configured CLI measurement resources in active bandwidth parts across all component carriers of the UE.

In a third aspect, alone or in combination with one or more of the first and second aspects, the capability information indicates a maximum number of simultaneously active CLI measurement resources per component carrier.

In a fourth aspect, alone or in combination with one or more of the first through third aspects, the capability information indicates a maximum number of ports for configured CLI measurement resources per component carrier.

In a fifth aspect, alone or in combination with one or more of the first through fourth aspects, the capability information indicates a maximum number of ports for configured CLI measurement resources in active bandwidth parts across all component carriers of the UE.

In a sixth aspect, alone or in combination with one or more of the first through fifth aspects, the capability information indicates a maximum number of ports in simultaneously active CLI measurement resources per component carrier.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a network node, in accordance with the present disclosure. Example process 1200 is an example where the network node (e.g., network node 110) performs operations associated with a reference resource for cross-link interference measurement.

As shown in FIG. 12, in some aspects, process 1200 may include outputting, for a UE, a CLI measurement reporting configuration indicating a reporting resource for reporting of a CLI measurement regarding an aggressor network node or an aggressor UE associated with the aggressor network node (block 1210). For example, the network node (e.g., using communication manager 150 and/or configuration component 1508, depicted in FIG. 15) may output, for a UE, a CLI measurement reporting configuration indicating a reporting resource for reporting of a CLI measurement regarding an aggressor network node or an aggressor UE associated with the aggressor network node, as described above, for example, with reference to FIGS. 7 and/or 8.

As further shown in FIG. 12, in some aspects, process 1200 may include obtaining a CLI measurement report on the reporting resource, the CLI measurement report indicating the CLI measurement on a measurement resource that occurs no later than a CLI reference resource that is defined by an offset relative to the reporting resource (block 1220). For example, the network node (e.g., using communication manager 150 and/or reception component 1502, depicted in FIG. 15) may obtain a CLI measurement report on the reporting resource, the CLI measurement report indicating the CLI measurement on a measurement resource that occurs no later than a CLI reference resource that is defined by an offset relative to the reporting resource, as described above, for example, with reference to FIGS. 7 and/or 8.

Process 1200 may include additional aspects, such as any single aspect or any combination of aspects described below and/or in connection with one or more other processes described elsewhere herein.

In a first aspect, the offset is based at least in part on a downlink bandwidth part numerology, p, of the UE.

In a second aspect, alone or in combination with the first aspect, the offset is a smallest value that is greater than or equal to $X*2^{\mu}$ and that causes the CLI reference resource to occur on a valid slot.

In a third aspect, alone or in combination with one or more of the first and second aspects, any downlink slot is a valid slot.

In a fourth aspect, alone or in combination with one or more of the first through third aspects, only downlink slots overlapping with slots configured as uplink slots for the aggressor network node are valid slots.

In a fifth aspect, alone or in combination with one or more of the first through fourth aspects, any sub-band full-duplex slot is a valid slot.

In a sixth aspect, alone or in combination with one or more of the first through fifth aspects, based at least in part on multiple measurement resources being configured for the CLI measurement, X is 5.

In a seventh aspect, alone or in combination with one or more of the first through sixth aspects, based at least in part on a single measurement resource being configured for the CLI measurement, X is 4.

In an eighth aspect, alone or in combination with one or more of the first through seventh aspects, process 1200 includes performing the CLI measurement based at least in part on a signal of the aggressor UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a network node, in accordance with the present disclosure. Example process 1300 is an example where the network node (e.g., network node 110) performs operations associated with a capability for cross-link interference measurement.

As shown in FIG. 13, in some aspects, process 1300 may include obtaining, from a UE, capability information indicating a capability relating to CLI measurement resources (block 1310). For example, the network node (e.g., using communication manager 150 and/or reception component 1502, depicted in FIG. 15) may obtain, from a UE, capability information indicating a capability relating to CLI measurement resources, as described above, for example, with reference to FIG. 9.

As further shown in FIG. 13, in some aspects, process 1300 may include outputting a CLI measurement resource configuration in accordance with the capability information (block 1320). For example, the network node (e.g., using communication manager 150 and/or configuration component 1508, depicted in FIG. 15) may output a CLI measurement resource configuration in accordance with the capability information, as described above, for example, with reference to FIG. 9.

As further shown in FIG. 13, in some aspects, process 1300 may include obtaining a CLI measurement report based at least in part on a CLI measurement on a CLI measurement resource configured by the CLI measurement resource configuration (block 1330). For example, the network node (e.g., using communication manager 150 and/or reception component 1502, depicted in FIG. 15) may obtain a CLI measurement report based at least in part on a CLI measurement on a CLI measurement resource configured by the CLI measurement resource configuration, as described above, for example, with reference to FIG. 9.

Process 1300 may include additional aspects, such as any single aspect or any combination of aspects described below and/or in connection with one or more other processes described elsewhere herein.

In a first aspect, the capability information indicates a maximum number of configured CLI measurement resources per component carrier.

In a second aspect, alone or in combination with the first aspect, the capability information indicates a maximum number of configured CLI measurement resources in active bandwidth parts across all component carriers of the UE.

In a third aspect, alone or in combination with one or more of the first and second aspects, the capability information indicates a maximum number of simultaneously active CLI measurement resources per component carrier.

In a fourth aspect, alone or in combination with one or more of the first through third aspects, the capability information indicates a maximum number of ports for configured CLI measurement resources per component carrier.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
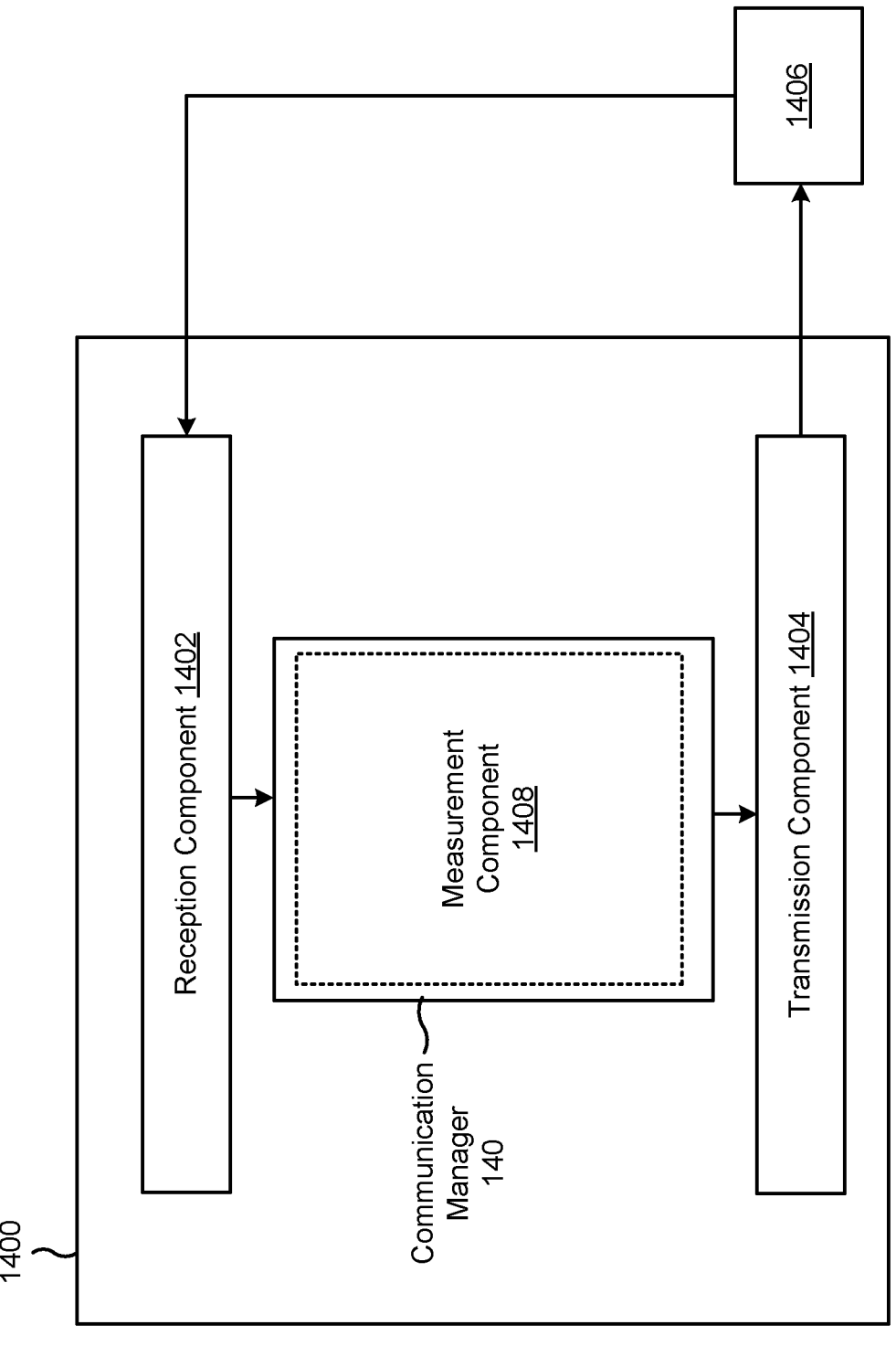
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a measurement component 1408, among other examples.

In some aspects, the apparatus 1400 may be configured to perform one or more operations described herein in connection with FIGS. 4-9. Additionally, or alternatively, the apparatus 1400 may be configured to perform one or more processes described herein, such as process 1000 of FIG. 10, process 1100 of FIG. 11, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory.

For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive a CLI measurement reporting configuration indicating a reporting resource for reporting of a CLI measurement regarding an aggressor network node or an aggressor UE associated with the aggressor network node. The transmission component 1404 may transmit a CLI measurement report on the reporting resource, the CLI measurement report indicating the CLI measurement on a measurement resource that occurs no later than a CLI reference resource that is defined by an offset relative to the reporting resource.

The measurement component 1408 may perform the CLI measurement based at least in part on a signal of the aggressor UE.

The transmission component 1404 may transmit capability information indicating a capability relating to CLI measurement resources. The reception component 1402 may receive a CLI measurement resource configuration in accordance with the capability information. The transmission component 1404 may transmit a CLI measurement report based at least in part on a CLI measurement on a CLI measurement resource configured by the CLI measurement resource configuration.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
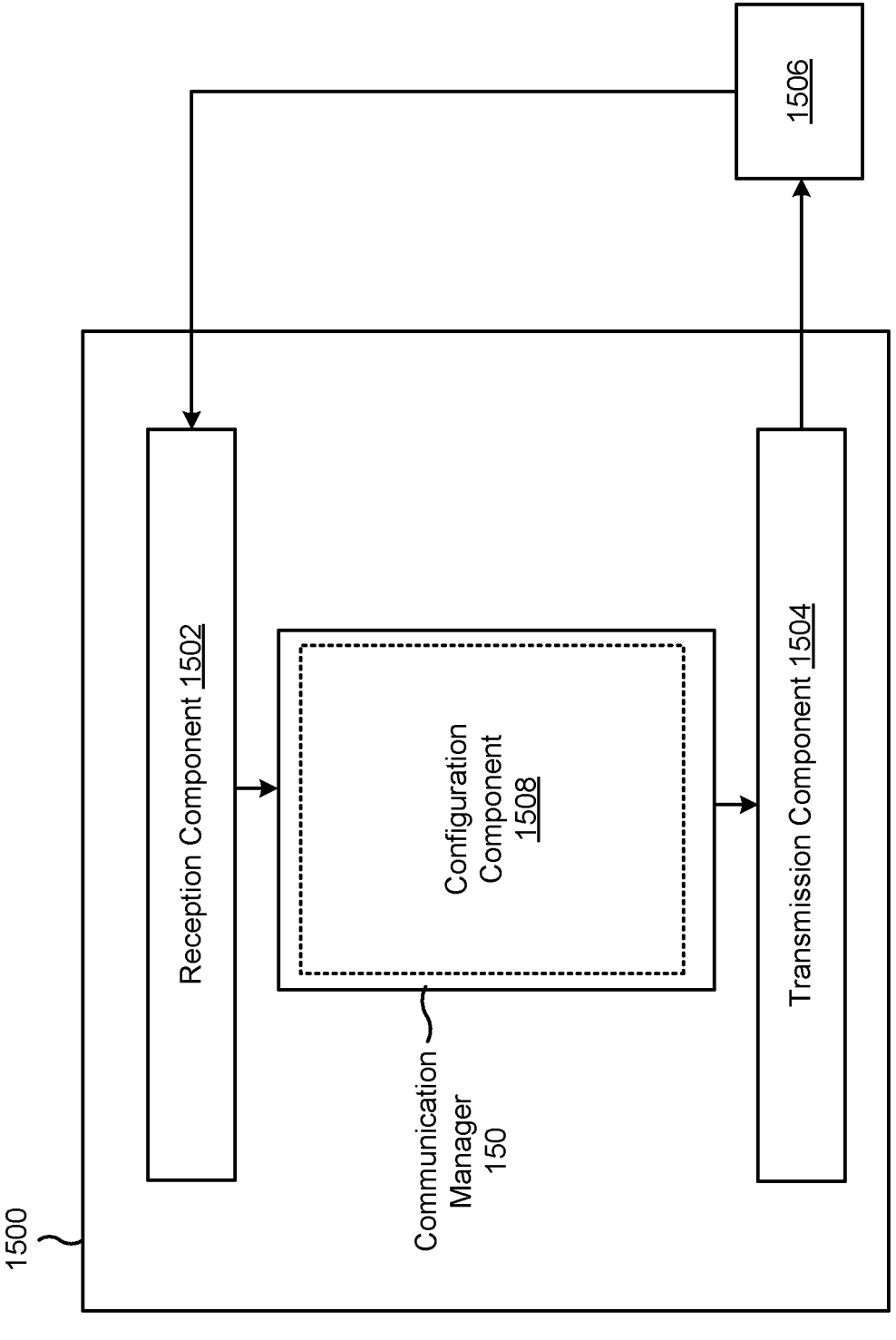
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include a configuration component 1508, among other examples.

In some aspects, the apparatus 1500 may be configured to perform one or more operations described herein in connection with FIGS. 4-9. Additionally, or alternatively, the apparatus 1500 may be configured to perform one or more processes described herein, such as process 1200 of FIG. 12, process 1300 of FIG. 13, or a combination thereof. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The configuration component 1508 may output, for a UE, a CLI measurement reporting configuration indicating a reporting resource for reporting of a CLI measurement regarding an aggressor network node or an aggressor UE associated with the aggressor network node. The reception component 1502 may obtain a CLI measurement report on the reporting resource, the CLI measurement report indicating the CLI measurement on a measurement resource that occurs no later than a CLI reference resource that is defined by an offset relative to the reporting resource.

The reception component 1502 may obtain, from a UE, capability information indicating a capability relating to CLI measurement resources. The configuration component 1508 may output a CLI measurement resource configuration in accordance with the capability information. The reception component 1502 may obtain a CLI measurement report based at least in part on a CLI measurement on a CLI measurement resource configured by the CLI measurement resource configuration.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving a cross-link interference (CLI) measurement reporting configuration indicating a reporting resource for reporting of a CLI measurement regarding an aggressor network node or an aggressor UE associated with the aggressor network node; and transmitting a CLI measurement report on the reporting resource, the CLI measurement report indicating the CLI measurement on a measurement resource that occurs no later than a CLI reference resource that is defined by an offset relative to the reporting resource.

Aspect 2: The method of Aspect 1, wherein the offset is based at least in part on a downlink bandwidth part numerology, p, of the UE.

Aspect 3: The method of Aspect 2, wherein the offset is a smallest value that is greater than or equal to $X*2^\mu$ and that causes the CLI reference resource to occur on a valid slot.

Aspect 4: The method of Aspect 3, wherein any downlink slot is a valid slot.

Aspect 5: The method of Aspect 3, wherein only downlink slots overlapping with slots configured as uplink slots for the aggressor network node are valid slots.

Aspect 6: The method of Aspect 3, wherein any sub-band full-duplex slot is a valid slot.

Aspect 7: The method of Aspect 3, wherein, based at least in part on multiple measurement resources being configured for the CLI measurement, X is 5.

Aspect 8: The method of Aspect 3, wherein, based at least in part on a single measurement resource based at least in part configured for the CLI measurement, X is 4.

Aspect 9: The method of any of Aspects 1-8, further comprising performing the CLI measurement based at least in part on a signal of the aggressor UE.

Aspect 10: A method of wireless communication performed by a user equipment (UE), comprising: transmitting capability information indicating a capability relating to cross-link interference (CLI) measurement resources; receiving a CLI measurement resource configuration in accordance with the capability information; and transmitting a CLI measurement report based at least in part on a CLI measurement on a CLI measurement resource configured by the CLI measurement resource configuration.

Aspect 11: The method of Aspect 10, wherein the capability information indicates a maximum number of configured CLI measurement resources per component carrier.

Aspect 12: The method of any of Aspects 10-11, wherein the capability information indicates a maximum number of configured CLI measurement resources in active bandwidth parts across all component carriers of the UE.

Aspect 13: The method of any of Aspects 10-12, wherein the capability information indicates a maximum number of simultaneously active CLI measurement resources per component carrier.

Aspect 14: The method of any of Aspects 10-13, wherein the capability information indicates a maximum number of ports for configured CLI measurement resources per component carrier.

Aspect 15: The method of any of Aspects 10-14, wherein the capability information indicates a maximum number of ports for configured CLI measurement resources in active bandwidth parts across all component carriers of the UE.

Aspect 16: The method of any of Aspects 10-15, wherein the capability information indicates a maximum number of ports in simultaneously active CLI measurement resources per component carrier.

Aspect 17: A method of wireless communication performed by a network node, comprising: outputting, for a UE, a cross-link interference (CLI) measurement reporting configuration indicating a reporting resource for reporting of a CLI measurement regarding an aggressor network node or an aggressor user equipment (UE) associated with the aggressor network node; and obtaining a CLI measurement report on the reporting resource, the CLI measurement report indicating the CLI measurement on a measurement resource that occurs no later than a CLI reference resource that is defined by an offset relative to the reporting resource.

Aspect 18: The method of Aspect 17, wherein the offset is based at least in part on a downlink bandwidth part numerology, p, of the UE.

Aspect 19: The method of Aspect 18, wherein the offset is a smallest value that is greater than or equal to $X*2^\mu$ and that causes the CLI reference resource to occur on a valid slot.

Aspect 20: The method of Aspect 19, wherein any downlink slot is a valid slot.

Aspect 21: The method of Aspect 19, wherein only downlink slots overlapping with slots configured as uplink slots for the aggressor network node are valid slots.

Aspect 22: The method of Aspect 19, wherein any sub-band full-duplex slot is a valid slot.

Aspect 23: The method of Aspect 19, wherein, based at least in part on multiple measurement resources being configured for the CLI measurement, X is 5.

Aspect 24: The method of Aspect 19, wherein, based at least in part on a single measurement resource being configured for the CLI measurement, X is 4.

Aspect 25: The method of any of Aspects 17-24, further comprising configuring the aggressor UE to transmit a reference signal.

Aspect 26: A method of wireless communication performed by a network node, comprising: obtaining, from a user equipment (UE), capability information indicating a capability relating to cross-link interference (CLI) measurement resources; outputting a CLI measurement resource configuration in accordance with the capability information; and obtaining a CLI measurement report based at least in part on a CLI measurement on a CLI measurement resource configured by the CLI measurement resource configuration.

Aspect 27: The method of Aspect 26, wherein the capability information indicates a maximum number of configured CLI measurement resources per component carrier.

Aspect 28: The method of any of Aspects 26-27, wherein the capability information indicates a maximum number of configured CLI measurement resources in active bandwidth parts across all component carriers of the UE.

Aspect 29: The method of any of Aspects 26-28, wherein the capability information indicates a maximum number of simultaneously active CLI measurement resources per component carrier.

Aspect 30: The method of any of Aspects 26-29, wherein the capability information indicates a maximum number of ports for configured CLI measurement resources per component carrier.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory;
a transceiver; and
one or more processors, coupled to the memory and the transceiver, configured to:
receive, via the transceiver, a cross-link interference (CLI) measurement reporting configuration indicating a reporting resource for reporting of a CLI measurement regarding an aggressor network node or an aggressor UE associated with the aggressor network node; and
transmit, via the transceiver, a CLI measurement report on the reporting resource, the CLI measurement report indicating the CLI measurement on one or more CLI measurement resources that occur no later than a CLI reference resource that is defined by an offset relative to the reporting resource, wherein the offset is based at least in part on a number of the one or more CLI measurement resources configured for the CLI measurement.

2. The UE of claim 1, wherein the offset is based at least in part on a downlink bandwidth part numerology, μ, of the UE.

3. The UE of claim 2, wherein the offset is a smallest value that is greater than or equal to X*2μ and that causes the CLI reference resource to occur on a valid slot.

4. The UE of claim 3, wherein any downlink slot is a valid slot.

5. The UE of claim 3, wherein only downlink slots overlapping with slots configured as uplink slots for the aggressor network node are valid slots.

6. The UE of claim 3, wherein any sub-band full-duplex slot is a valid slot.

7. The UE of claim 3, wherein, if the number of the one or more CLI measurement resources is greater than one, X is 5.

8. The UE of claim 3, wherein, if the number of the one or more CLI measurement resources equals one, X is 4.

9. The UE of claim 1, wherein the one or more processors are further configured to perform, using the transceiver, the CLI measurement based at least in part on a signal of the aggressor UE.

10. A user equipment (UE) for wireless communication, comprising:
a memory;
a transceiver; and
one or more processors, coupled to the memory, configured to:
transmit, via the transceiver, capability information indicating a capability relating to one or more cross-link interference (CLI) measurement resources;
receive, via the transceiver, a CLI measurement resource configuration in accordance with the capability information; and
transmit, via the transceiver and over a reporting resource, a CLI measurement report based at least in part on a CLI measurement on the one or more CLI measurement resources configured by the CLI measurement resource configuration, wherein the one or more CLI measurement resources occur no later than a CLI reference resource that is defined by an offset relative to the reporting resource, and wherein the offset is based at least in part on a number of the one or more CLI measurement resources configured for the CLI measurement.

11. The UE of claim 10, wherein the capability information indicates a maximum number of configured CLI measurement resources per component carrier.

12. The UE of claim 10, wherein the capability information indicates a maximum number of configured CLI measurement resources in active bandwidth parts across all component carriers of the UE.

13. The UE of claim 10, wherein the capability information indicates a maximum number of simultaneously active CLI measurement resources per component carrier.

14. The UE of claim 10, wherein the capability information indicates a maximum number of ports for configured CLI measurement resources per component carrier.

15. The UE of claim 10, wherein the capability information indicates a maximum number of ports for configured CLI measurement resources in active bandwidth parts across all component carriers of the UE.

16. The UE of claim 10, wherein the capability information indicates a maximum number of ports in simultaneously active CLI measurement resources per component carrier.

17. A network node for wireless communication, comprising:

a memory; and one or more processors, coupled to the memory, configured to:

output, for a UE, a cross-link interference (CLI) measurement reporting configuration indicating a reporting resource for reporting of a CLI measurement regarding an aggressor network node or an aggressor user equipment (UE) associated with the aggressor network node; and obtain a CLI measurement report on the reporting resource, the CLI measurement report indicating the CLI measurement on one or more CLI measurement resources that occur no later than a CLI reference resource that is defined by an offset relative to the reporting resource, wherein the offset is based at least in part on a number of the one or more CLI measurement resources configured for the CLI measurement.

18. The network node of claim 17, wherein the offset is based at least in part on a downlink bandwidth part numerology, μ, of the UE.

19. The network node of claim 18, wherein the offset is a smallest value that is greater than or equal to $X*2\mu$ and that causes the CLI reference resource to occur on a valid slot.

20. The network node of claim 19, wherein any downlink slot is a valid slot.

21. The network node of claim 19, wherein only downlink slots overlapping with slots configured as uplink slots for the aggressor network node are valid slots.

22. The network node of claim 19, wherein any sub-band full-duplex slot is a valid slot.

23. The network node of claim 19, wherein, if the number of the one or more CLI measurement resources is greater than one, X is 5.

24. The network node of claim 19, wherein, if the number of the one or more CLI measurement resources equals one, X is 4.

25. The network node of claim 17, wherein the one or more processors are further configured to configure the aggressor UE to transmit a reference signal.

26. A network node for wireless communication, comprising:

a memory; and one or more processors, coupled to the memory, configured to:

obtain, from a user equipment (UE), capability information indicating a capability relating to one or more cross-link interference (CLI) measurement resources;

output a CLI measurement resource configuration in accordance with the capability information; and obtain, via a reporting resource, a CLI measurement report based at least in part on a CLI measurement on the one or more CLI measurement resources configured by the CLI measurement resource configuration, wherein the one or more CLI measurement resources occur no later than a CLI reference resource that is defined by an offset relative to the reporting resource, and wherein the offset is based at least in part on a number of the one or more CLI measurement resources configured for the CLI measurement.

27. The network node of claim 26, wherein the capability information indicates a maximum number of configured CLI measurement resources per component carrier.

28. The network node of claim 26, wherein the capability information indicates a maximum number of configured CLI measurement resources in active bandwidth parts across all component carriers of the UE.

29. The network node of claim 26, wherein the capability information indicates a maximum number of simultaneously active CLI measurement resources per component carrier.

30. The network node of claim 26, wherein the capability information indicates a maximum number of ports for configured CLI measurement resources per component carrier.

* * * * *